US 9,790,784 B2

(12) United States Patent
Balogh et al.

(10) Patent No.: US 9,790,784 B2
(45) Date of Patent: Oct. 17, 2017

(54) TELEMETRY SYSTEM, CURRENT SENSOR, AND RELATED METHODS FOR A DRILLING SYSTEM

(71) Applicant: APS Technology, Inc., Wallingford, CT (US)

(72) Inventors: William Thomas Balogh, Jersey Village, TX (US); Macmillan M. Wisler, Kingwood, TX (US)

(73) Assignee: APS Technology, Inc., Wallingford, CT (US)

( * ) Notice: Subject to any disclaimer, the term of this patent is extended or adjusted under 35 U.S.C. 154(b) by 531 days.

(21) Appl. No.: 14/282,262

(22) Filed: May 20, 2014

(65) Prior Publication Data

US 2015/0337650 A1 Nov. 26, 2015

(51) Int. Cl.
*E21B 47/12* (2012.01)
*G01V 3/34* (2006.01)
*G01V 3/28* (2006.01)

(52) U.S. Cl.
CPC .............. *E21B 47/122* (2013.01); *G01V 3/34* (2013.01); *G01V 3/28* (2013.01)

(58) Field of Classification Search
CPC ........ E21B 47/122; E21B 47/12; E21B 47/01; E21B 47/024; E21B 17/003; E21B 23/02;
(Continued)

(56) References Cited

U.S. PATENT DOCUMENTS 2,225,668 A 12/1940 Subkow
3,411,584 A 11/1968 Sizer
(Continued)

FOREIGN PATENT DOCUMENTS

CA 2760931 A 6/2013
CA 2786471 A 7/2013
(Continued)

OTHER PUBLICATIONS

U.S. Appl. No. 14/627,806, filed Feb. 20, 2015, David David Cramer.
(Continued)

*Primary Examiner* — Clayton E Laballe
*Assistant Examiner* — Ruifeng Pu
(74) *Attorney, Agent, or Firm* — Baker & Hostetler LLP; Gregory A. Grissett

(57) ABSTRACT

This disclosure includes a current sensor configured to detect a signal current in a drilling system component of a drilling system, a telemetry system, and a method for detecting a signal current. The current sensor includes a magnetic body, at least one field coil positioned on the magnetic body, and at least one drive coil positioned on the magnetic body. The at least one field coil configured to detect a first magnetic field that passes within the magnetic body that is induced by the signal current carried by the drill system component when the current sensor is positioned in proximity to the drilling system component. The at least one drive coil configured to generate a second magnetic field. The current sensor is configured to modulate the second magnetic field such the at least one field coil detects the modulated magnetic field.

39 Claims, 15 Drawing Sheets

(58) Field of Classification Search
CPC .......... E21B 47/18; E21B 7/046; E21B 47/04; E21B 47/06; E21B 4/02; G01V 3/34; G01V 3/28; G01V 3/30; G01V 3/26; G01V 3/15; G01R 15/185; G01R 15/183; G01R 15/20; G01R 15/186; G01R 15/207; G01R 33/093; H01Q 1/04; H01Q 21/205

See application file for complete search history.

(56) References Cited

U.S. PATENT DOCUMENTS

| | | | |
|---|---|---|---|
| 3,518,609 A | 6/1970 | Fontenot, Jr. | |
| 3,765,494 A | 10/1973 | Kielman | |
| 4,066,128 A | 1/1978 | Davis | |
| 4,130,162 A | 12/1978 | Nelson | |
| 4,216,536 A | 8/1980 | More | |
| 4,348,672 A | 9/1982 | Givler | |
| 4,416,330 A | 11/1983 | Merritt | |
| RE31,613 E * | 6/1984 | Lienhard | G01R 15/185 324/117 R |
| 4,630,243 A | 12/1986 | Macleod | |
| 4,689,775 A | 8/1987 | Scherbatskoy | |
| 4,825,946 A | 5/1989 | Schnatzmeyer | |
| 5,045,795 A * | 9/1991 | Gianzero | G01V 3/28 324/339 |
| 5,065,099 A * | 11/1991 | Sinclair | G01V 3/28 324/339 |
| 5,189,415 A * | 2/1993 | Shimada | E21B 47/122 175/40 |
| 5,328,685 A | 7/1994 | Janchitraponvej | |
| 5,463,313 A | 10/1995 | Berkcan | |
| 5,606,260 A * | 2/1997 | Giordano | G01N 27/72 324/225 |
| 5,767,667 A * | 6/1998 | Shafie | G01R 19/20 324/117 R |
| 5,782,261 A | 7/1998 | Becker | |
| 5,818,352 A | 10/1998 | McClure | |
| 5,955,884 A | 9/1999 | Payton et al. | |
| 5,959,548 A | 9/1999 | Smith | |
| 6,018,602 A | 1/2000 | Mayor et al. | |
| 6,111,409 A | 8/2000 | Edwards | |
| 6,364,035 B2 | 4/2002 | Brune et al. | |
| 6,367,323 B1 | 4/2002 | Camwell et al. | |
| 6,411,078 B1 * | 6/2002 | Nakagawa | G01R 23/12 324/76.54 |
| 6,417,666 B1 | 7/2002 | Mercer | |
| 6,456,059 B1 * | 9/2002 | Blakely | G01R 15/183 324/117 H |
| 6,470,274 B1 | 10/2002 | Mollison | |
| 6,531,871 B1 | 3/2003 | Hay | |
| 6,657,597 B2 | 12/2003 | Rodney | |
| 6,810,955 B2 | 11/2004 | Roth | |
| 6,915,848 B2 * | 7/2005 | Thomeer | E21B 47/01 166/250.11 |
| 6,915,849 B2 | 7/2005 | Nuth | |
| 6,954,060 B1 * | 10/2005 | Edel | G01R 15/183 324/117 R |
| 7,151,466 B2 | 12/2006 | Gabelmann | |
| 7,170,423 B2 | 1/2007 | Wisler | |
| 7,178,608 B2 | 2/2007 | Mayes | |
| 7,204,309 B2 | 4/2007 | Segura | |
| 7,213,607 B2 | 5/2007 | De Almeida | |
| 7,243,028 B2 | 7/2007 | Young | |
| 7,327,144 B2 | 2/2008 | Brune | |
| 7,480,207 B2 | 1/2009 | Marsh | |
| 7,506,699 B1 | 3/2009 | Harvey et al. | |
| 7,506,700 B1 | 3/2009 | Harvey et al. | |
| 7,681,663 B2 | 3/2010 | Cobern | |
| 7,775,301 B2 | 8/2010 | Brune et al. | |
| 7,832,503 B2 | 11/2010 | Sand et al. | |
| 8,069,931 B2 | 12/2011 | Hooks | |
| 8,474,548 B1 | 7/2013 | Young | |
| 8,952,700 B2 | 2/2015 | Wisler | |
| 9,291,049 B2 | 3/2016 | Switzer et al. | |
| 2002/0170711 A1 | 11/2002 | Nuth | |
| 2003/0184488 A1 * | 10/2003 | Smith | G01V 3/28 343/787 |
| 2003/0229450 A1 * | 12/2003 | Strickland | G01V 3/28 702/10 |
| 2004/0004553 A1 | 1/2004 | Rodney | |
| 2004/0035575 A1 | 2/2004 | Roth | |
| 2004/0100256 A1 * | 5/2004 | Fickert | E21B 47/082 324/221 |
| 2004/0104047 A1 | 6/2004 | Peter | |
| 2004/0156264 A1 | 8/2004 | Gardner | |
| 2004/0169367 A1 | 9/2004 | Sutherland | |
| 2004/0226749 A1 | 11/2004 | Biglin et al. | |
| 2004/0251897 A1 * | 12/2004 | Pedersen | G01R 33/04 324/253 |
| 2004/0257061 A1 * | 12/2004 | George de Buda | G01R 15/186 324/117 R |
| 2005/0016771 A1 | 1/2005 | Mayes | |
| 2005/0046587 A1 | 3/2005 | Wisler | |
| 2005/0061369 A1 | 3/2005 | De Almeida | |
| 2005/0140373 A1 | 6/2005 | Li | |
| 2006/0041795 A1 | 2/2006 | Gabelmann | |
| 2006/0066292 A1 * | 3/2006 | Tadatsu | G01R 15/183 324/117 H |
| 2006/0118298 A1 | 6/2006 | Millar et al. | |
| 2006/0124354 A1 | 6/2006 | Witte | |
| 2006/0202852 A1 | 9/2006 | Peter | |
| 2007/0052407 A1 * | 3/2007 | Hausperger | G01R 15/20 324/117 R |
| 2007/0079988 A1 * | 4/2007 | Konschuh | E21B 4/02 175/40 |
| 2007/0239403 A1 | 10/2007 | Hornbostel | |
| 2007/0247328 A1 | 10/2007 | Petrovi et al. | |
| 2007/0251729 A1 | 11/2007 | Sand et al. | |
| 2008/0048655 A1 * | 2/2008 | Hausperger | G01R 15/185 324/260 |
| 2008/0224707 A1 * | 9/2008 | Wisler | G01V 3/28 324/338 |
| 2008/0265892 A1 * | 10/2008 | Snyder | G01V 3/28 324/339 |
| 2009/0261986 A1 | 10/2009 | Mehta | |
| 2010/0033187 A1 * | 2/2010 | Reiderman | G01V 3/28 324/346 |
| 2010/0052689 A1 * | 3/2010 | Hall | G01V 3/28 324/339 |
| 2010/0134112 A1 * | 6/2010 | Zhang | G01V 5/00 324/339 |
| 2010/0258351 A1 | 10/2010 | Hooks | |
| 2010/0262370 A1 | 10/2010 | Bittar et al. | |
| 2011/0001633 A1 | 1/2011 | Lam et al. | |
| 2011/0006753 A1 * | 1/2011 | Yu | G01R 15/185 324/117 R |
| 2011/0017512 A1 | 1/2011 | Codazzi | |
| 2011/0061864 A1 | 3/2011 | Umphries et al. | |
| 2011/0253382 A1 | 10/2011 | Nadkrynechny | |
| 2011/0304220 A1 * | 12/2011 | Whitehead | H01F 21/08 307/104 |
| 2012/0062215 A1 * | 3/2012 | Ide | B82Y 25/00 324/202 |
| 2012/0091996 A1 * | 4/2012 | Koch | G01R 19/20 324/117 R |
| 2012/0126992 A1 | 5/2012 | Rodney | |
| 2013/0009646 A1 | 1/2013 | Simon | |
| 2013/0140019 A1 | 6/2013 | Pare et al. | |
| 2013/0169278 A1 | 7/2013 | Bittar et al. | |
| 2013/0176139 A1 | 7/2013 | Chau et al. | |
| 2013/0234717 A1 * | 9/2013 | Wang | G01V 3/28 324/339 |
| 2013/0241561 A1 | 9/2013 | Allen | |
| 2013/0241742 A1 | 9/2013 | Contant et al. | |
| 2013/0265171 A1 | 10/2013 | Hay | |
| 2013/0278252 A1 * | 10/2013 | Sasaki | G01R 33/02 324/253 |
| 2013/0320940 A1 * | 12/2013 | Dimitrovski | H03F 9/02 323/249 |
| 2014/0032116 A1 | 1/2014 | Guner | |

(56) References Cited

U.S. PATENT DOCUMENTS

| | | |
|---|---|---|
| 2014/0041863 A1 | 2/2014 | Dowling |
| 2014/0048332 A1 | 2/2014 | Schmidt et al. |
| 2014/0110395 A1 | 4/2014 | Parsche |
| 2014/0240140 A1 | 8/2014 | Switzer et al. |
| 2015/0053485 A1 | 2/2015 | Altimas et al. |
| 2015/0075770 A1* | 3/2015 | Fripp ............... E21B 43/1185 166/65.1 |
| 2015/0145687 A1* | 5/2015 | Roberts ............ E21B 47/122 340/853.2 |
| 2015/0218938 A1 | 8/2015 | Weisbeck et al. |
| 2015/0247401 A1* | 9/2015 | Cramer ............. E21B 47/122 324/338 |
| 2015/0276970 A1 | 10/2015 | Wu |
| 2015/0285061 A1* | 10/2015 | Wu ................... E21B 47/024 340/854.1 |
| 2015/0293254 A1* | 10/2015 | Wang ................ G01V 3/26 324/355 |
| 2015/0337650 A1 | 11/2015 | Balogh |
| 2016/0003035 A1 | 1/2016 | Logan et al. |
| 2016/0138388 A1 | 5/2016 | Chau et al. |
| 2016/0146000 A1 | 5/2016 | Logan et al. |
| 2016/0187523 A1* | 6/2016 | Sanmartin ......... G01V 3/28 324/339 |
| 2016/0245068 A1 | 8/2016 | David et al. |
| 2016/0290066 A1 | 10/2016 | Frith |
| 2016/0369615 A1 | 12/2016 | Cune et al. |

FOREIGN PATENT DOCUMENTS

| | | |
|---|---|---|
| EP | 0911484 A2 | 4/1999 |
| EP | 0913555 A2 | 5/1999 |
| EP | 0922836 A1 | 6/1999 |
| GB | 2008899 A | 6/1979 |
| WO | WO2006028701 A2 | 3/2006 |
| WO | WO2012175658 A2 | 6/2012 |

OTHER PUBLICATIONS

G. Velasco-Quesada, et al., Novel Advances in Microsystems Technologies and Their Applications, CRC Press, Chapter 21, Aug. 2013, p. 348, 3 pgs.

U.S. Appl. No. 05/855,095, filed Nov. 25, 1977, Nicholson.

International Patent Application No. PCT/US2015/018249; Notification of Transmittal of the International Search Report and the Written Opinion of the International Searching Authority mailed May 21, 2015, 10 pgs.

International Patent Application No. PCT/US2014/066801; Notification of Transmittal of the International Search Report and the Written Opinion of the International Searching Authority mailed Jul. 21, 2015, 16 pgs.

International Patent Application No. PCT/US2015/031467; Notification of Transmittal of the International Search Report and the Written Opinion of the International Searching Authority mailed Aug. 19, 2015, 8 pgs.

International Patent Application No. PCT/US2015/031467; Int'l Preliminary Report on Patentability; dated Dec. 1, 2016; 7 pages.

* cited by examiner

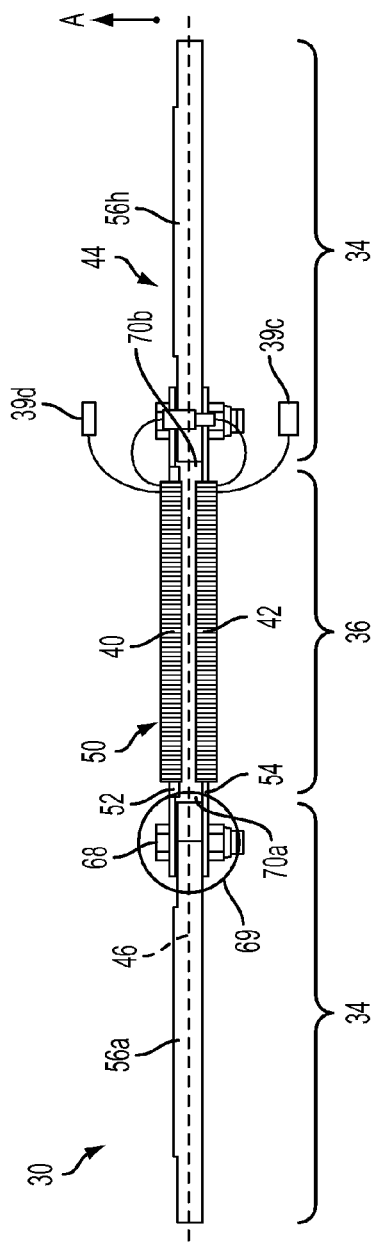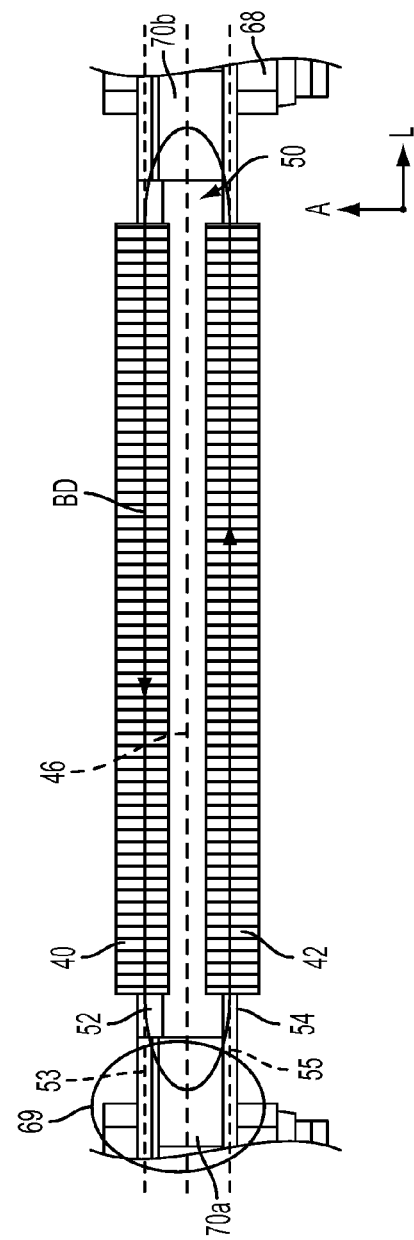
FIG. 6A
FIG. 6B

TELEMETRY SYSTEM, CURRENT SENSOR, AND RELATED METHODS FOR A DRILLING SYSTEM

TECHNICAL FIELD

The present disclosure relates to a telemetry system, a current sensor, and related methods, and in particular, to a telemetry system, a current sensor, and related methods in a drilling system.

BACKGROUND

Underground drilling systems are used to define a borehole in an earthen formation. During drilling the borehole, it is desirable to measure certain properties related to the formation, or the condition of the drilling operation downhole, and transmit that information to the surface for further analysis and/or automatic adjustment of drilling parameters if needed. Measurement while drilling (MWD) and logging-while-drilling (LWD) tools are types of drilling tools used downhole to obtain and transmit drilling data to the surface. Some MWD and LWD tools are electromagnetic (EM) telemetry tools that are configured to generate an electromagnetic field that passes into the formation and propagates to the surface. At greater depths in the bore, the EM field signal attenuation and noise can limit meaningful signal detection or prevent detection altogether

SUMMARY

An embodiment of the present disclosure includes a current sensor configured to detect a signal current in a drilling system component of a drilling system. The drilling system is configured to form a borehole in an earthen formation. The current sensor includes a magnetic body at least partially composed of a magnetic material. The current sensor can also include at least one field coil positioned on the magnetic body, the at least one field coil configured to detect a first magnetic field that passes within the magnetic body. The first magnetic field being induced by the signal current carried by the drill system component when the current sensor is positioned in proximity to the drilling system component carrying the signal current. The current sensor includes at least one drive coil positioned on the magnetic body, the at least one drive coil configured to generate a second magnetic field. Wherein when the current sensor is positioned in proximity to the signal current and the at least one drive coil generates the second magnetic field, the current sensor is adapted such that 1) the second magnetic field causes the second portion of the magnetic body to alternate into and out of magnetic saturation so as to modulate the first magnetic field that passes within the magnetic body, and 2) modulation of the first magnetic field induces a modulated signal in the at least one field coil.

Another embodiment of the present disclosure include a telemetry system for a drilling system. The telemetry system includes a receiver that includes a magnetic body, and a first magnetic field passes along the magnetic body when the receiver is in proximity to the drilling system component that carries a signal current, the receiver further including at least one field coil positioned on the magnetic body, and at least one drive coil positioned on the magnetic body. The at least one drive coil is configured to generate a second magnetic field such that at least a majority of the second magnetic field produced by the at least one drive coil does generate a significant voltage in the at least one field coil when the at least one drive coil generates the second magnetic field. Wherein the receiver is configured to alternate the second portion of the magnetic body into and out of magnetic saturation, thereby modulating the first magnetic field that passes at least partially through the at least one field coil, and inducing a modulated signal in the at least one field coil.

Another embodiment of the present disclosure includes a method for detecting a signal current transmitted along a drilling system component of a drilling system. The method includes transmitting a signal current toward a current sensor supported by the drilling system component. The current sensor includes a magnetic body, at least one field coil supported by the magnetic body, and at least one drive coil supported by the magnetic body. The signal current generate a first magnetic field within the magnetic body. The method includes generating a second magnetic field via the at least one drive coil so as to cause the second portion of the magnetic body to alternate into and out of magnetic saturation, thereby modulating the first magnetic field within the magnetic body. In response to the generating step, causing the modulated first magnetic field to induce a modulated signal in the at least one field coil as a portion of the modulated first magnetic field passes through the magnetic body and through a portion of the at least one field coil.

BRIEF DESCRIPTION OF THE DRAWINGS

FIG. 6A is a partial side view of the current sensor shown in FIG. 5;

FIG. 6B is a detailed side view of a portion of the current sensor shown in FIG. 6B;

DETAILED DESCRIPTION OF ILLUSTRATIVE EMBODIMENTS

Figure 1:
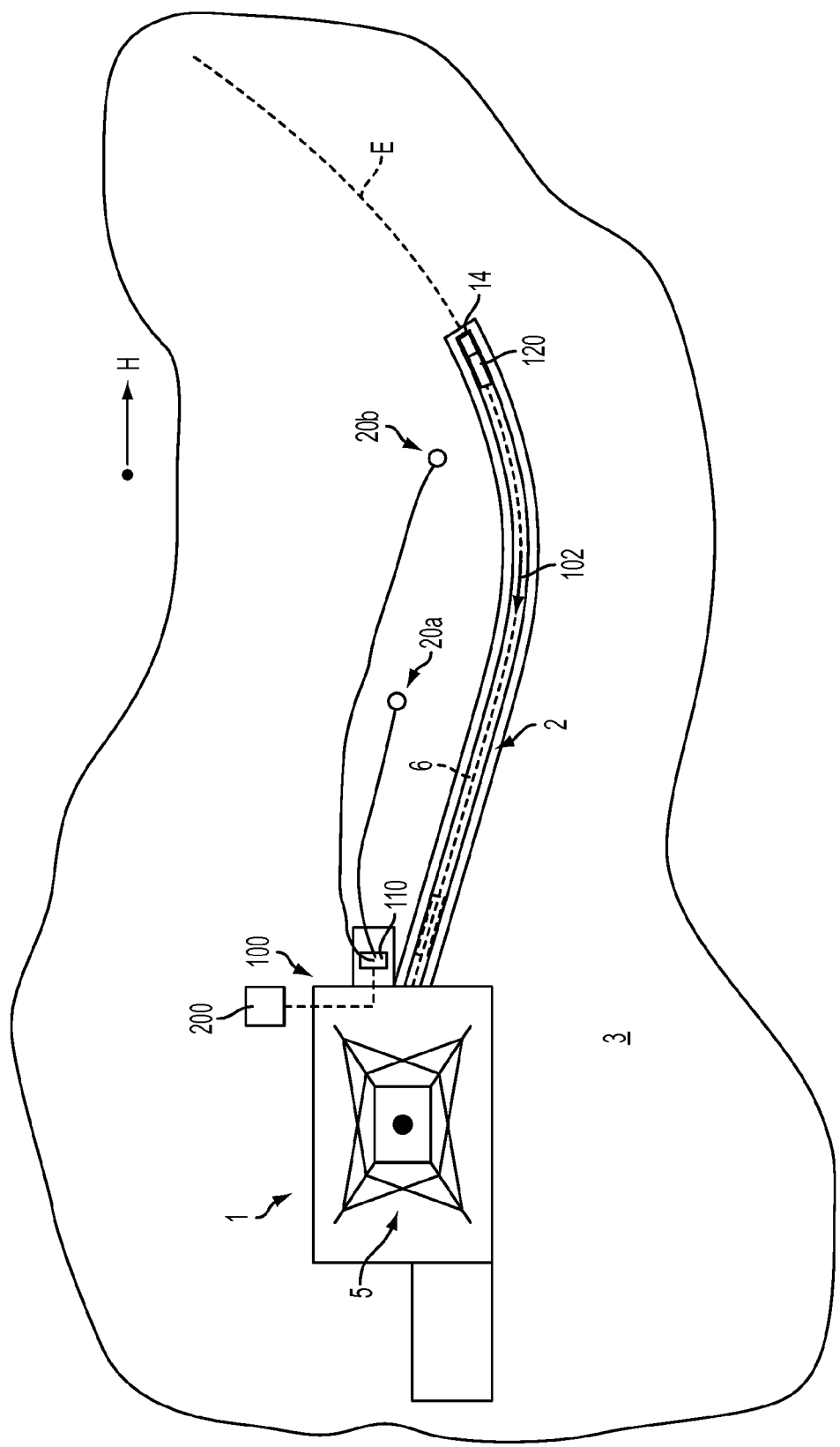
FIG. 1 is a schematic plan view of a drilling system configured to form a borehole in an earthen formation including a telemetry system, according to an embodiment of the present disclosure.
Figure 2:
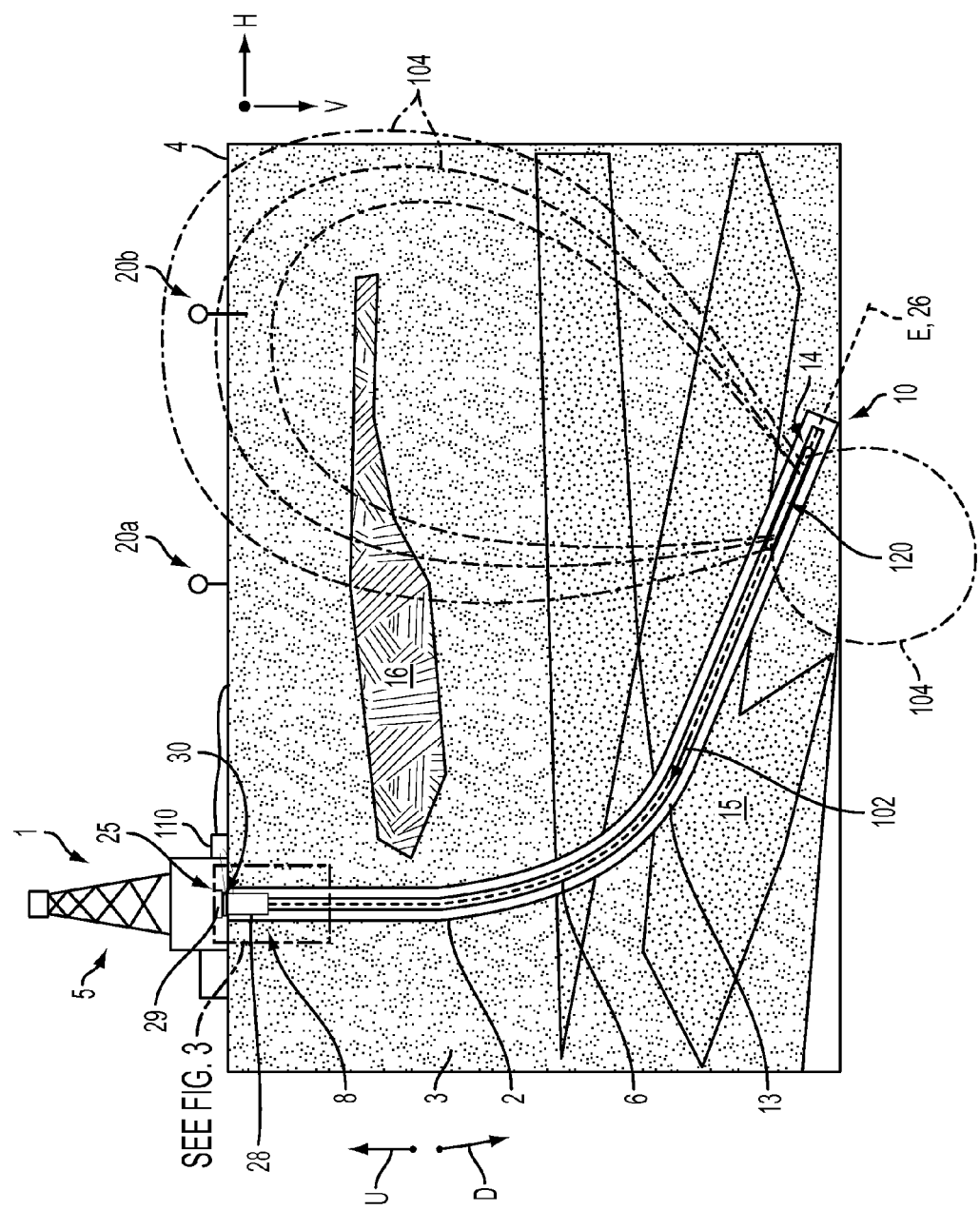
FIG. 2 is a schematic side view of the drilling system shown in FIG. 1.

Referring to FIGS. 1 and 2, the drilling system 1 is configured to drill a borehole 2 in an earthen formation 3 during a drilling operation. The drilling system 1 includes a drill string 6 for forming the borehole 2 in the earthen formation 3, a telemetry system 100 and at least one computing device 200 in electronic communication with the telemetry system 100. The telemetry system 100 can include at least one receiver 110 and a telemetry tool 120 that can transmit an EM telemetry signal composed of a current 102 (referred to herein as the signal current 102) travelling in the drill string and an electric field 104 (referred to herein as electric field signal 104) in the formation to the receiver 110 located at the surface 4. The signal current 102 and the electric field signal 104 can include drilling data encoded therein concerning the drilling operation. The computing device 200 can host one or more applications, for instance software applications, that can initiate desired decoding or signal processing, and perform various methods for monitoring and analyzing the drilling data obtained during the drilling operation, as will be further detailed below.

The present disclosure describes a telemetry system and methods that provide for reliable detection of signals transmitted from lower depths in the borehole 2 or along the surface 4 where noise can impact signal reception. For instance, EM signals transmitted from deep depths in the borehole 2 to the surface 4 are subject to attenuation and noise as the electrical field and current signals 104 and 102 travel to the surface 4 and pass through different formation types 15 and 16 (FIG. 2). In one exemplary embodiment, the telemetry system 100 is configured to detect low frequency signal currents, such as 1 to 100 Hz which are contaminated with noise typical of drilling operations. As is known in the art, lower frequency propagated signals are attenuated less than higher frequencies. Typical current sensors, however, are less efficient at lower frequencies. For the current sensor of the present disclosure, measurement efficiency is not degraded at lower frequencies. For downhole applications, more sensitive current detection at lower frequencies permits data transmission from lower borehole depths. For surface applications, the current sensor 30 can be used along any conductive path to detect a signal current. For instance, the current sensor 30 be positioned to encircle the signal current, on above or below the BOP, or downhole attached to surface casing 28. In exemplary embodiment, the current sensor 30 can be positioned below the BOP, in part because the largest signal currents are typically found the closer the current sensor is positioned to the downhole tool. In another embodiment the sensor may be attached to the bottom of surface casing and installed in the well.

The telemetry system 100 can include signal current 102 detection, or EM electric field signal 104 detection, or the combination of signal current 102 and electric field signal 104 detection. EM signal current detection can be used when a detectable signal is traveling through the drill pipe. It should be appreciated that EM signal detection typically refers to electric field signal detection, or quasi-static field signal detection. In operation the electric field is detected as a voltage signal typically measured between antenna electrodes 20a and 20b or between either antenna 20a or 20b and a point connected to the surface casing 28 or BOP 29. When formation properties or noise reduces EM voltage signal strength, signal current 102 detection can be used. It should be appreciated that detecting the EM electric signal 104 is not an essential component for reliable signal detection in a drilling system 1.

Continuing with FIGS. 1 and 2, the drilling system 1 is configured to drill the borehole 2 in an earthen formation 3 along a borehole axis E such that the borehole axis E extends at least partially along a vertical direction V. The vertical direction V refers to a direction that is perpendicular to the surface 4 of the earthen formation 3. It should be appreciated that the drill string 6 can be configured for directional drilling, whereby all or a portion of the borehole 2 is angularly offset with respect to the vertical direction V along a horizontal direction H. The horizontal direction H is mostly perpendicular to the vertical direction V so as to be aligned with or parallel to the surface 4. The terms "horizontal" and "vertical" used herein are as understood in the drilling field, and are thus approximations. Thus, the horizontal direction H can extend along any direction that is perpendicular to the vertical direction V, for instance north, east, south and west, as well as any incremental direction between north, east, south and west. Further, downhole or downhole location means a location closer to the bottom end of the drill string 6 than the top end of the drill string 6. Accordingly, a downhole direction D (FIG. 2) refers to the direction from the surface 4 toward a bottom end (not numbered) of the borehole 2, while an uphole direction U (FIG. 2) refers to the direction from the bottom end of the borehole 2 toward the surface 4. The downhole and uphole directions D and U can be curvilinear for directional drilling operations. Thus, the drilling direction or well path extends partially along the vertical direction V and the horizontal direction H (FIG. 2) in any particular geographic direction as noted above.

Continuing with FIGS. 1 and 2, the drilling system 1 includes a derrick 5 that supports the drill string 6. A blow out preventer (BOP) 29 can be poisoned over the bore hole at the surface. A structure below the BOP 29 can support the BOP 29 and extend toward the bore hole. A casing 28 extends into the formation 3 in the downhole direction D. The drill string 6 is elongate along a central longitudinal axis 26 and includes a top end 8 and a bottom end 10 spaced from the top end 8 along the central longitudinal axis 26. The drill string 6 also extends along a longitudinal direction (not numbered) that is aligned with the central longitudinal axis 26. The drill string 6 includes multiple drill string components that define the drill string 6 and the internal passage (not numbered) through which drill mud travels in a downhole direction D. One or more motors, such as a top drive or rotary table, are configured to rotate the drill string 6, the drill bit 14, or both so as to control the rotational speed (RPM) of, and torque on, the drill bit 14. A pump is configured to pump the drill mud (pump and fluid not shown) downward through the internal passage (not shown) in the drill string 6. When the drill mud exits the drill string 6 at the drill bit 14, the returning drilling mud flows upward toward the surface 4 through an annular passage 13 (FIG. 3) formed between the drill string 6 and a wall (not numbered) of the earthen formation 3 that defines the bore hole 2. Optionally, a mud motor may be disposed at a downhole location of the drill string 6 to rotate the drill bit 14 independent of the rotation of the drill string 6. The top drives, rotary tables, pumps, and other components can generate noise that impacts signal detection at the drill site.

Referring to FIGS. 1 and 2, the telemetry system 100 includes a telemetry tool 120 that transmits a signal current 102 to the receiver 110. The telemetry tool 120 includes a transmitter, a power source, an electrode and a housing that supports a portion of the transmitter (details of the telemetry tool 120 are not shown). The telemetry tool 120 can be electronically connected to one or more sensors. Some of the sensors can be located downhole and connected to the tool 120. Other sensors can be located at or near the surface, e.g. on the derrick, and connected to other tools The telemetry tool transmitter can include a modulator configured to encode drilling data into the signal transmitted via the transmitter. The transmitter can be configured to propagate the signal current along a conductive path in the drill string 6 for detection at the surface 4. Currents in the drill string or voltages between a rig location for example casing 28 and or BOP 29 and antennas 20a and/or 20b or between antenna pairs 20a and 20b, can be measured to receive the data from telemetry tool 120. Drilling data can include, but is not limited to, directional data e.g. inclination, azimuth, and tool face data, formation characteristics, drill string and drill bit vibration data, weight-on-bit (WOB) data, and torque-on-bit (TOB) and pressure data. As further detailed below, drilling data can be obtained via sensors at a downhole location in the bore hole 2, and/or via sensors located at or near the surface 4.

Figure 3:
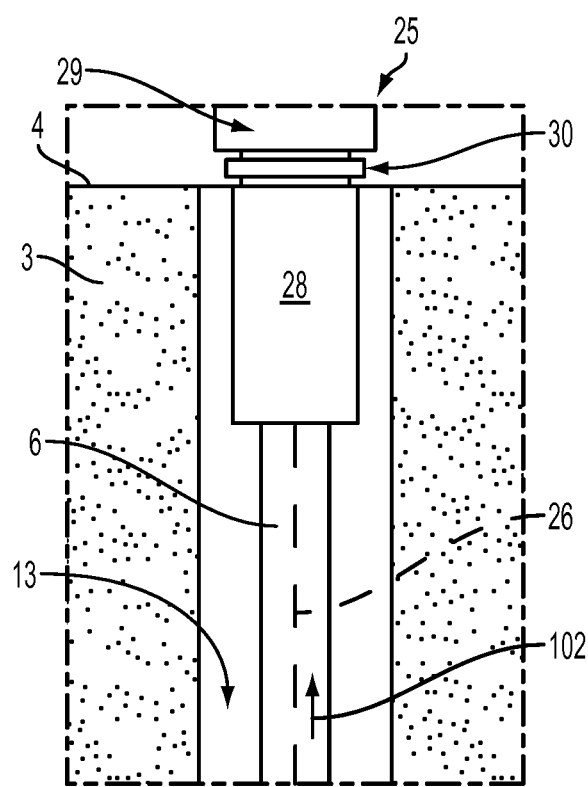
FIG. 3 is a detailed side view of a portion of the drilling system and drill string shown in FIG. 1, illustrating a current sensor supported by a casing, according to an embodiment of the present disclosure.
Figure 4:
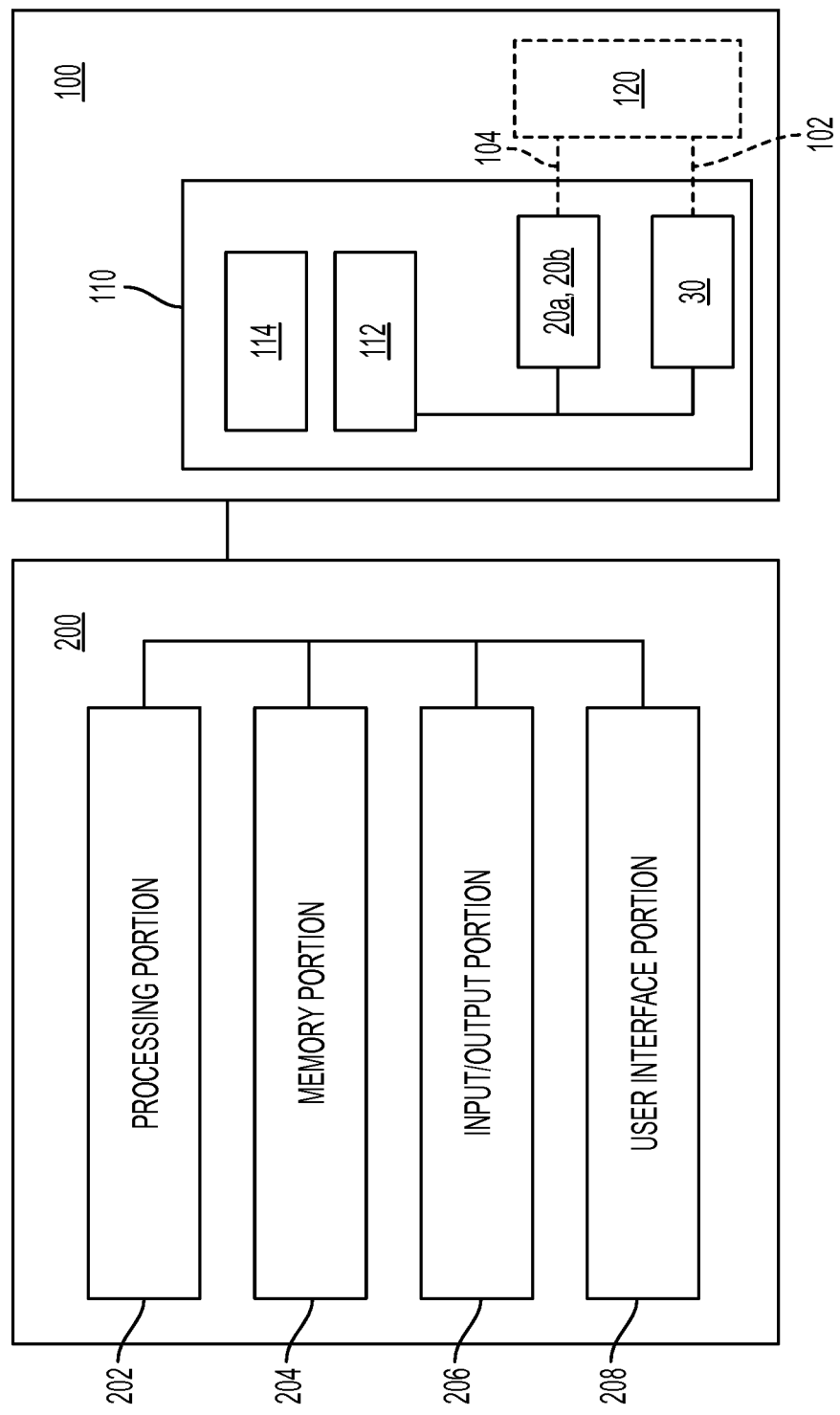
FIG. 4 is a block diagram of a computing device in electronic communication with a telemetry system of the drilling system shown in FIGS. 1 and 2.

Turning to FIG. 4, the telemetry system 100, for instance the receiver 110, can include at least one current sensor 30 (FIG. 3) configured to detect the signal current 102. The receiver 110 may include receiver components 112 and a demodulator 114. Receiver components may include a power supply, a controller and processors, oscillators and other components that aid in signal processing. The current sensor 30 is in electronic communication with receiver components 112. The receiver component can be electronically connected to the demodulator 114 and/or the computing device 200. The demodulator 114 can be in electronic communication directly or indirectly with the computing device 200. The receiver 110 may also include antenna pairs 20a and 20b that detect an EM signal 104 transmitted by the telemetry tool 120. The receiver 100 can process detected signals 102 and 104, and additionally or alternatively direct the detected signals 102 and 104 to the computing device 200 for further processing.

Continuing with FIG. 4, the drilling system 1 can include one or more computing devices 200 in electronic communication with the telemetry system 100. The computing device 200 is configured to receive, process, and store various drilling operation information. As illustrated, the computing device can be in electronic communication with the receiver 110. The receiver 110 can receive signals 102 and/or 104 obtained via the current sensor 30 and the antenna pairs 20a and 20b transmitted from the telemetry tool 120 at a downhole location, and or receive signals transmitted from locations at or near the surface 4.

Any suitable computing device 200 may be configured to host a software application configured to process drilling data encoded in the signals 102, 104, and further monitor and analyze drilling data. It will be understood that the computing device 200 can include any appropriate device, examples of which include a desktop computing device, a server computing device, or a portable computing device, such as a laptop, tablet or smart phone. In an exemplary configuration illustrated in FIG. 4, the computing device 200 includes a processing portion 202, a memory portion 204, an input/output portion 206, and a user interface (UI) portion 208. It is emphasized that the block diagram depiction of the computing device 200 is exemplary and not intended to imply a specific implementation and/or configuration. The processing portion 202, memory portion 204, input/output portion 206 and user interface portion 208 can be coupled together to allow communications therebetween. As should be appreciated, any of the above components may be distributed across one or more separate devices and/or locations.

In various embodiments, the input/output portion 206 includes a receiver of the computing device 200, a transmitter (not to be confused with components of the telemetry tool 120 described below) of the computing device 200, or an electronic connector for wired connection, or a combination thereof. The input/output portion 206 is capable of receiving and/or providing information pertaining to communication with a network such as, for example, the Internet. As should be appreciated, transmit and receive functionality may also be provided by one or more devices external to the computing device 200. For instance, the input/output portion 206 can be in electronic communication with the receiver 110.

Depending upon the exact configuration and type of processor, the memory portion 204 can be volatile (such as some types of RAM), non-volatile (such as ROM, flash memory, etc.), or a combination thereof. The computing device 200 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the computing device 200.

The computing device 200 can contain the user interface portion 208, which can include an input device and/or display (input device and display not shown), that allows a user to communicate with the computing device 200. The user interface 208 can include inputs that provide the ability to control the computing device 200, via, for example, buttons, soft keys, a mouse, voice actuated controls, a touch screen, movement of the computing device 200, visual cues (e.g., moving a hand in front of a camera on the computing device 200), or the like. The user interface 208 can provide outputs, including visual information, such as the visual indication of the plurality of operating ranges for one or more drilling parameters via the display 213 (not shown). Other outputs can include audio information (e.g., via speaker), mechanically (e.g., via a vibrating mechanism), or a combination thereof. In various configurations, the user interface 208 can include a display, a touch screen, a keyboard, a mouse, an accelerometer, a motion detector, a speaker, a microphone, a camera, or any combination thereof. The user interface 208 can further include any suitable device for inputting biometric information, such as, for example, fingerprint information, retinal information, voice information, and/or facial characteristic information, for instance, so as to require specific biometric information for access to the computing device 200.

An exemplary architecture can include one or more computing devices 200, each of which can be in electronic communication with a database (not shown) and the telemetry system 100 via common communications network. The database can be separate from the computing device 200 or could also be a component of the memory portion 204 of the computing device 200. It should be appreciated that numerous suitable alternative communication architectures are envisioned. Once the application has been installed onto the computing device 200, such as described above, the application can transfer information between other computing devices on the common network, such as, for example, the Internet. For instance configuration, a user may transmit, or cause the transmission of information via the network regarding one or more drilling parameters to the computing device of a supplier of the telemetry tool 120, or alternatively to a computing device of another third party, e.g., oil company or oil services company, via the network. The third party can view, via a display, the drilling data. Further a user may access drilling data from the member portion 204 of the computing device 200. It should be appreciated that "access" or "accessing" as used herein can include retrieving information stored in the memory portion of the local computing device, or sending instructions via the network to a remote computing device so as to cause information to be transmitted to the memory portion of the local computing device for access locally. In addition or alternatively, accessing can include accessing information stored in the memory portion of the remote computing device 200. The computing device 200 may be operated in whole or in part by, for example, a rig operator at the drill site, a drill site owner, oil services drilling company, and/or any manufacturer or supplier of drilling system components, or other service provider. As should be appreciated, each of the parties set forth above and/or other relevant parties may operate any number of respective computing device and may communicate internally and externally using any number of networks including, for example, wide area networks (WAN's) such as the Internet or local area networks (LAN's).

Turning to FIGS. 2 and 3, the current sensor 30 can be supported by a drilling system component 25 that carries the signal current 102. A drilling system component 25 can be any part or portion of the drilling system 1. For instance, the drilling system component 25 can include any part or portion of the derrick 5, platform (not shown), drive motors, casing 28, blow out preventers 29, the drill string 6 and sections thereof (e.g. such as drill pipes, drill collars, the bottomhole assembly), and downhole tools. In accordance with the illustrated embodiment, the current sensor 30 is positioned below the BOP 29 in proximity to the drill string 6 such that the signal current 102 extends through the current sensor 30. In alternative embodiment, the current sensor 30 can be positioned in the well so as to supported by and extend around the casing 28. For offshore applications, the current sensor 30 can be placed on seafloor at the well head, so as to detect a signal travelling on the drill string beneath the seafloor.

Figure 5:
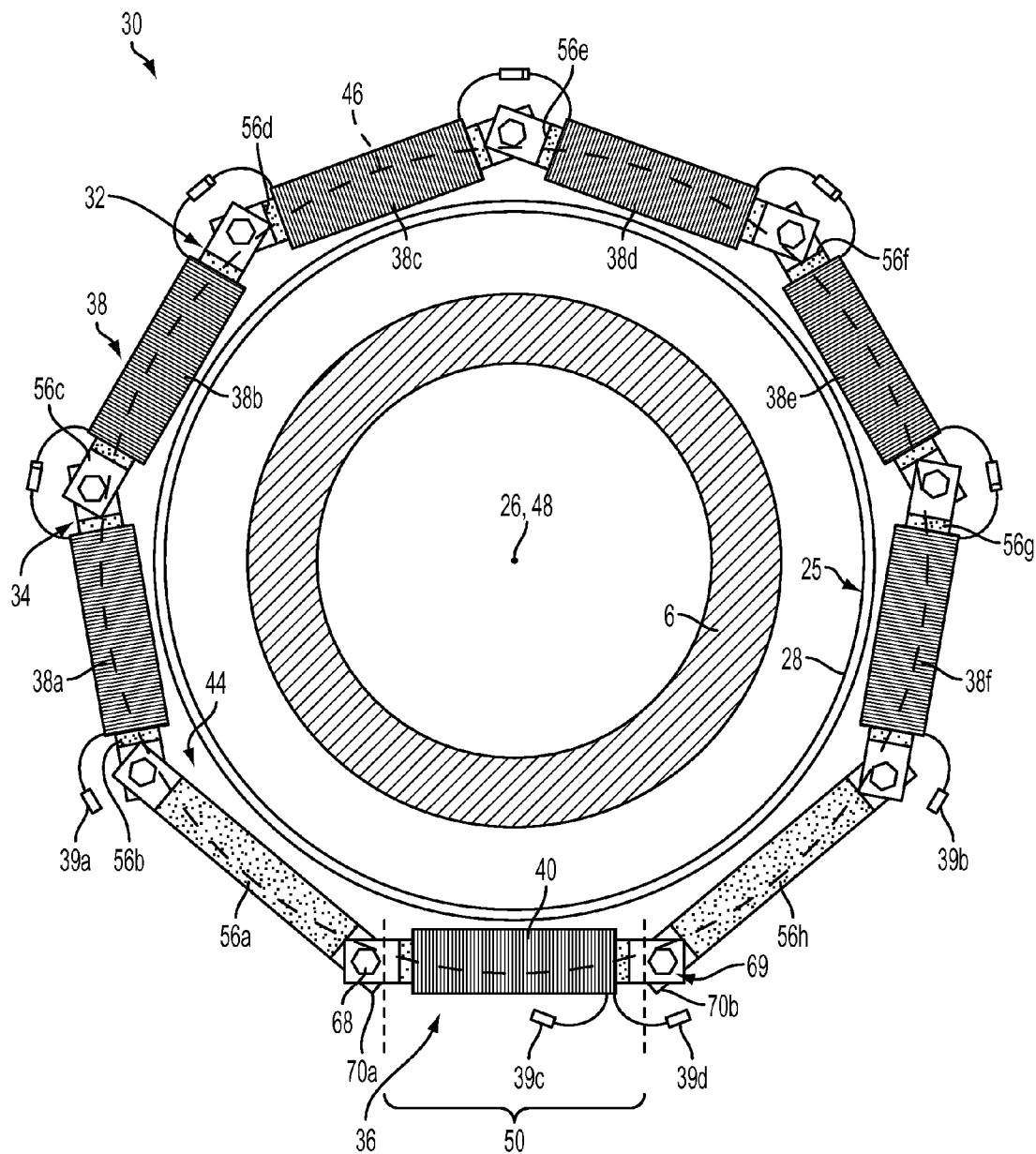
FIG. 5 is a top view of the current sensor surrounding the casing and drill string shown in FIGS. 2 and 3.

Referring to FIGS. 5 and 6A, the current sensor 30 can be positioned to detect the signal current 102 passing through the drilling system component 25. The current sensor 30 includes a magnetic body 32, at least one field coil 38 supported by magnetic body 32, and at least one drive coil, such as a first drive coil 40 and a second drive coil 42, supported by the magnetic body 32. In accordance with the illustrated embodiment, the at least one field coil 38 is supported by a first portion of the magnetic body 32, and at least one drive coil, such as a first drive coil 40 and a second drive coil 42, are supported by a second portion of the magnetic body 32.

Figure 6C:
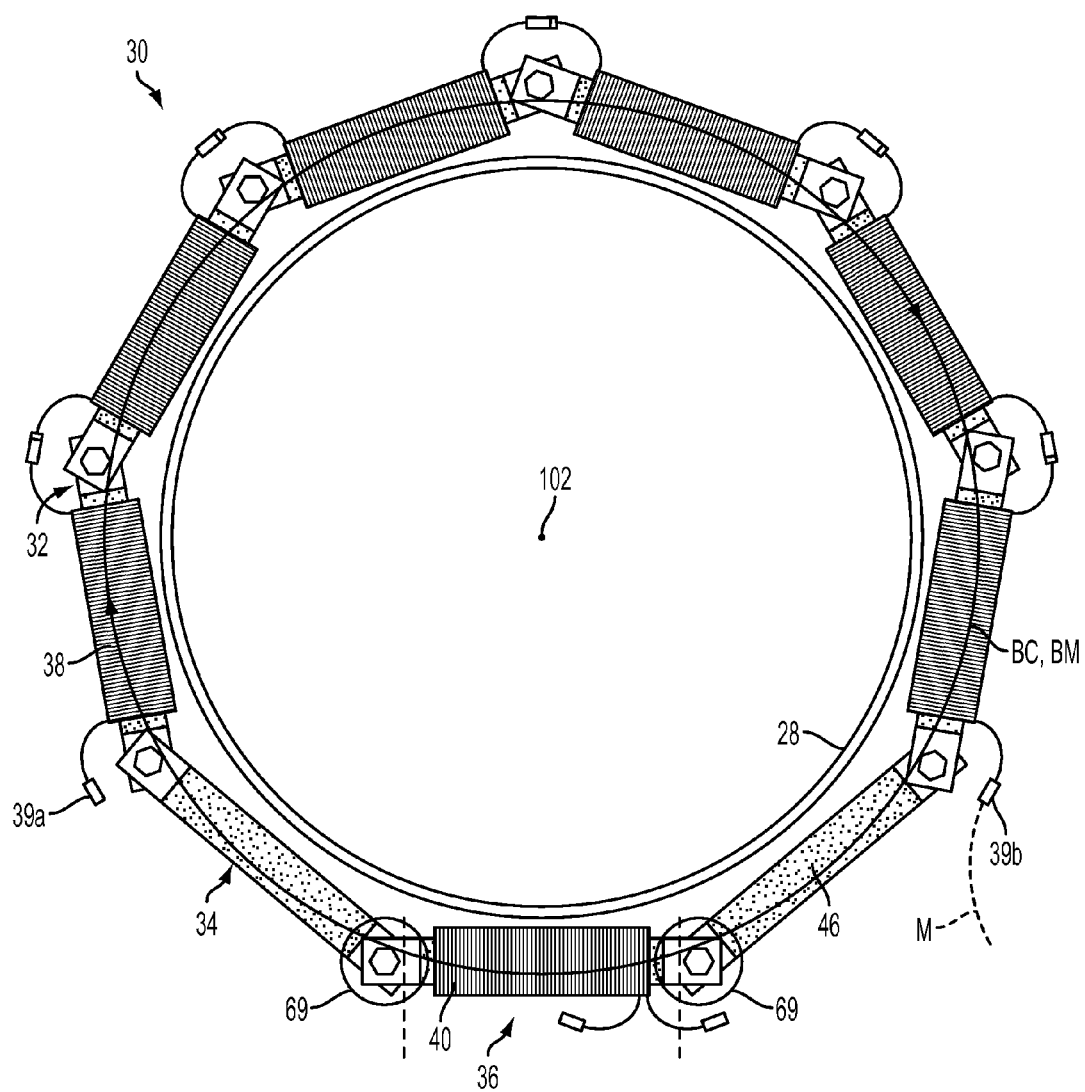
FIG. 6C is another top view of the current sensor shown in FIGS. 2 and 3, illustrating generation and path of magnetic fields along current sensor induced by a signal current and a drive current into a drive coil.

Continuing with FIGS. 5 and 6A, the magnetic body 32 can have a first or field body component 34 and a second or drive body component 36 arranged so as to define a passage 44 that extends through the magnetic body 32 along a direction A. The current sensor 30 defines an axis 46 that is transverse to the direction A (FIG. 6A), and a center 48 spaced inwardly from the axis 46. The magnetic body 32 extends along the axis 46 about the center 48 thereby defining the passage 44. The magnetic body 32 can also define a path along which a magnetic field can travel when the signal current 102 passes through the passage 44. For instance, the path can extend along a portion or all of the axis 46. In accordance with the illustrated embodiment, the field body component 34 can define a gap 50 (FIGS. 5 and 6B). For instance, the field body component can include end portions spaced apart to define the gap 50. The drive body component 36 can be configured to span the gap 50. The gap 50 can be a physical gap that extends between portions of the field body component 34. The gap 50 can also define a break in the path of the magnetic field BC (FIG. 6C) through the magnetic body 32. Thus, the drive body component 36 can span the gap 50 so as to create a path for magnetic field flow. In accordance with the illustrated embodiment, the drive body component 36 can be attached to the field body component 34 so to define an overlap 69 adjacent to the gap 50 (see FIGS. 6B and 6C) thereby providing the magnetic path between the field and drive body components 34 and 36, as will be further detailed below. The overlap 69 causes on offset between the first and second drive coils 40 and 42 and the axis 46 along the direction A (or any direction that is transverse to the axis 46). The offset can help facilitate signal detection by decoupling magnetic fields generated by the drive coils 40 and 42 from the field coil 38. In an alternative embodiment, the gap 50 can be a break in the path of the magnetic field due to transition of one material to another. For instance, the field body component 34 can be formed of a first material and the gap 50 can include body formed of a second material that spans the gap 50. The field body component 34 may be referred to in the description interchangeably as the first body component 34 or the first portion of the magnetic body 32. Likewise, the drive body component 36 may be referred in this description interchangeably as the second body component 36 or the second portion of the magnetic body 32.

Turning to FIG. 5, the magnetic body 32 can be shaped and sized to receive the drilling system component 25. The magnetic body 32 can have any suitable shape that surrounds the drilling system component 25. In accordance with the illustrated embodiment, when the current sensor 30 is positioned below the BOP 29 (as shown in FIG. 3), the longitudinal axis 26 of the drill string 6 can pass through or near the center 48 of the passage 44. Alternatively the current sensor 30 can be configured such that when it is positioned near or on the BOP 29, the center 48 of the passage 44 can be offset from the longitudinal axis 26 of the drill string 6. Accordingly, the magnetic body 32 can be generally circular, square, rectilinear, diamond shaped, triangular, pentagonal, hexagonal, octagonal, or any other suitable shape that extends about the center 48.

Continuing with FIG. 5, the field body component 34 includes at least one field bar 56. In accordance with the illustrated embodiment, the field body component 34 includes a plurality of field bars 56a, 56b, 56c, 56d, 56e, 56f, 56g, and 56h interconnected so as to extend along the axis 46 and partially define the passage 44 and gap 50. The gap 50 extends from an end 70a of the field bar 56a and end 70b of field bar 56h. The number of field bars 56 connected together can be modified so that the size of the field body component 34 can be adjusted to accommodate the size of the drilling system component 25. For instance, more field bars 56 can be connected together for a larger diameter drilling system components 25, while fewer field bars 56 may be needed for drill pipe sections or other components that typically have a smaller diameters. In accordance with the illustrated embodiment, eight field bars 56a-56h are connected along the axis 46 so as define the passage 44 sufficiently sized to receive the drilling system component. It should be appreciated that more than eight field bars 56 or fewer than eight field bars 58 can be used to define the field body component 34. The field bars 56 can be connected together by fasteners 68 or other means. Further, the fasteners 68 (FIG. 6A) permit the adjacent field bars 56 to pivot relative to each other during assembly along the drilling system component 25. The fasteners 68 can be later tightened so as to minimize spacing between adjacent field bars 56 at the overlap 69. It may be desirable to insert a magnetic paste in the overlap 69 so as to minimize disruption of a magnetic field passing along the magnetic body 32 through the overlap 69.

Figure 7:
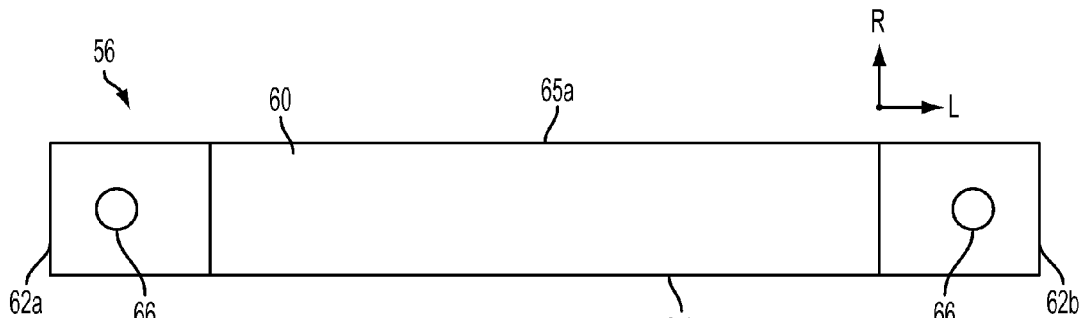
FIG. 7 is a top view of a field bar of the current sensor shown in FIG. 5.
Figure 8:
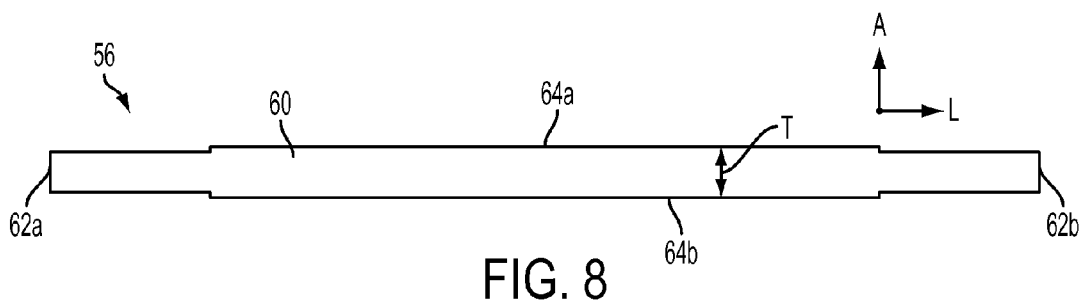
FIG. 8 is a side view of the field bar shown in FIG. 7.

Turning to FIGS. 7 and 8, each field bar 56 includes an elongate body 60 having opposed ends 62a and 62b, opposed upper and lower surfaces 64a and 64b spaced apart with respect to each other in the direction A, and opposed sides 65a and 65b spaced apart along a direction R that is perpendicular to direction A. Each field bar 56 can also define a maximum cross-sectional dimension T that extends from the upper surface 64a to the lower surface 64b along the direction A at a location between the opposed ends 62a and 62b toward or at a midpoint between ends 62a and 62b. Each field bar 56 can define a width that extends from side 65a to side 65b along the direction R, and a length that extends from the end 62a to the end 62b along a direction L that is perpendicular to directions A and R. The width can be between 0.1 to several inches as need. For instance, in an alternative embodiment, a field bar 56 can have length that is slightly less than an external perimeter of a drilling system component 25, such that a monolithic field bar 56 defines the field body component 34. Each field bar 56 defines apertures 66 that are sized to receive fasteners 68. The fasteners 68 (FIG. 6A) connect adjacent field bars 56 together in an overlapping configuration. While the field bar 56 is shown as a rectilinear elongate body, the field bar 56 can have other shapes. For instance, the field bar 56 can include a curved body that defines an arc with respect to the center 48. When such a curved body is connected together, the field body component defines a more circular configuration.

Figure 14:
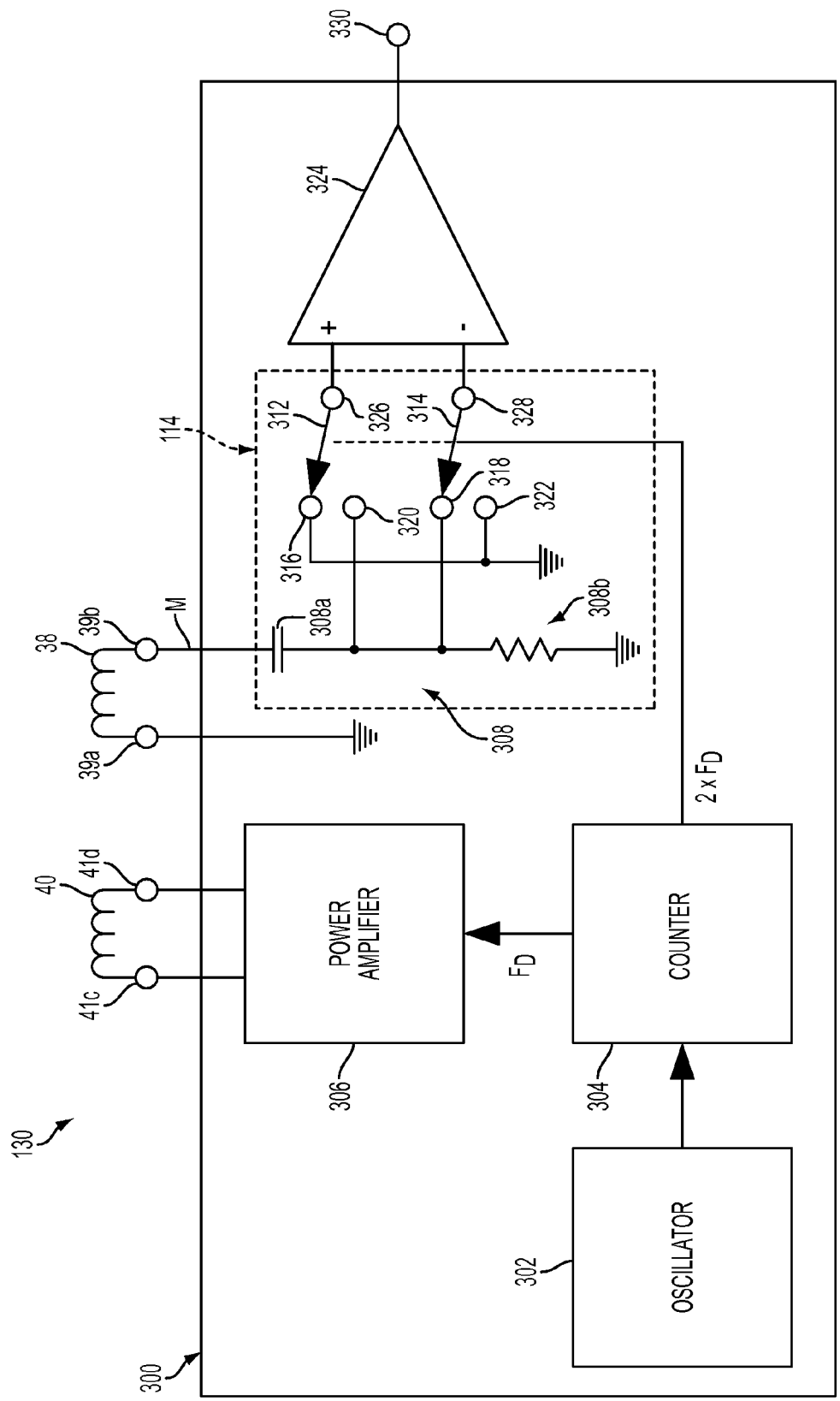
FIG. 14 is a schematic of a circuit for the current sensor shown in FIG. 5, configured as an open loop sensor.
Figure 15:
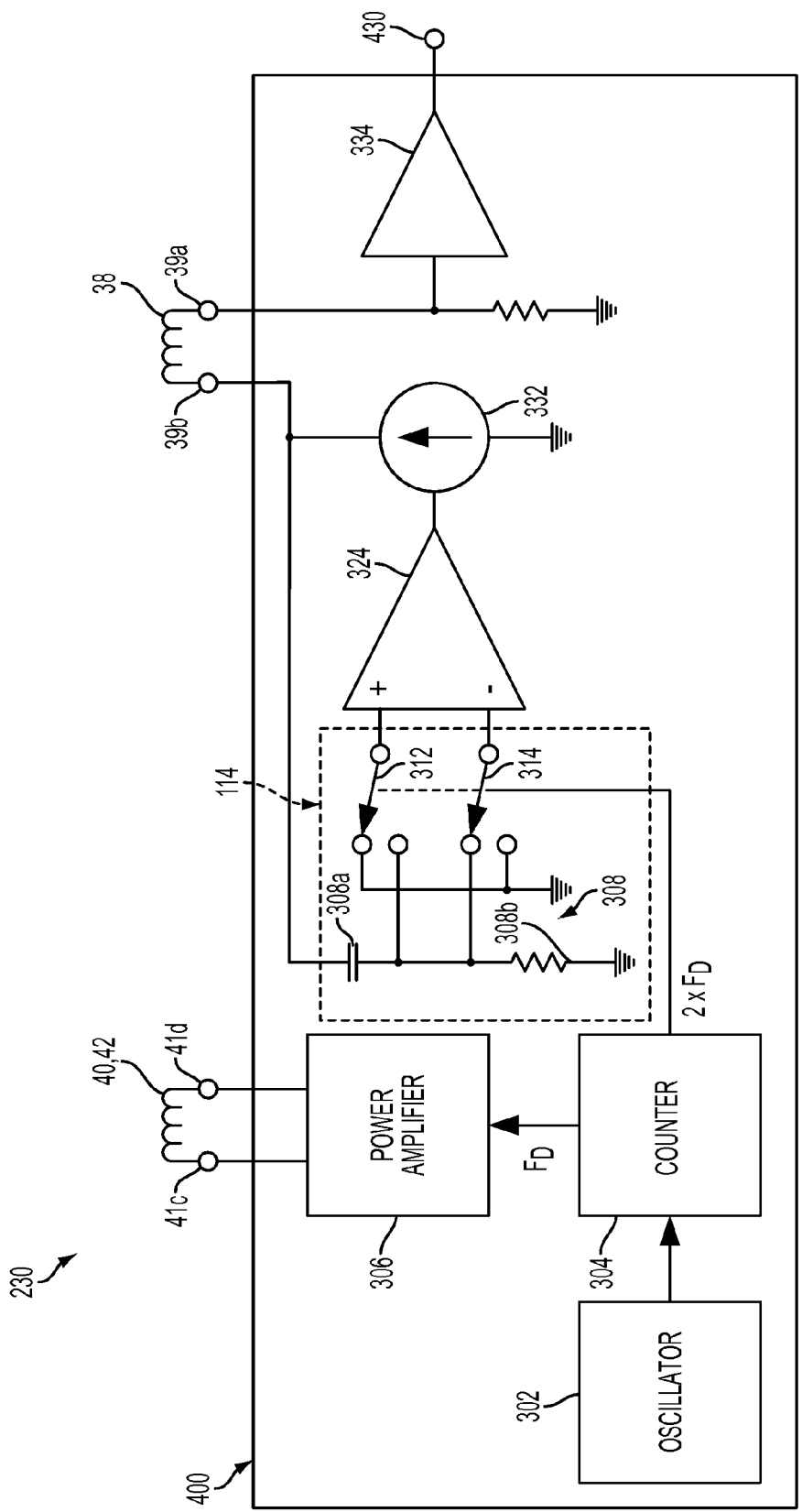
FIG. 15 is a schematic of a circuit for the current sensor shown in FIG. 5, configured as a closed loop sensor.
Figure 16:
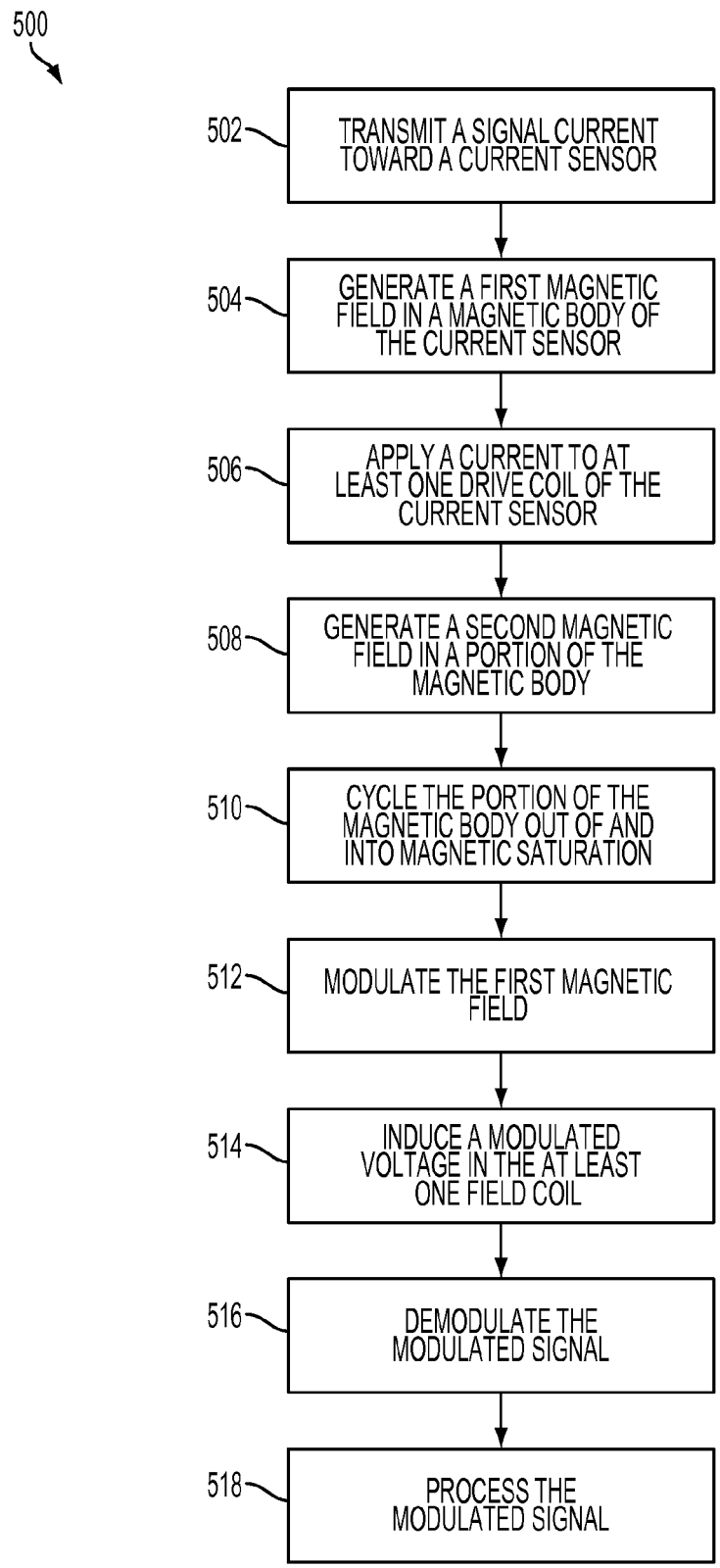
FIG. 16 is a block diagram illustrating a method for transmitting and receiving drilling data in the drilling system shown in FIGS. 1 to 3.

Continuing with FIG. 5, the at least one field coil 38 is positioned along and surrounds the field body component 34. In accordance with the illustrated embodiment, a portion up to all of the field body component 34 can include a field coil 38. For instance, the current sensor 30 can include a plurality of field coils 38a, 38b, 38c, 38d, 38e, 38f which are wrapped around a respective field bar 56b, 56c, 56d, 56e, 56f, 56g. The fields coils 38a-38f may be placed in a series along a circuit 300, 400 (FIGS. 14 and 15) with the receiver components 112 and demodulator 114. In accordance with the illustrated embodiment, field bars 56a and 56h are attached to the drive body component 36 and may not include a field coil 38 in order to minimize interference between the magnetic fields generated by the drive coils 40 and 42 and the field coils 38. The plurality of field coils 38a-38g are electrically connected via terminal 39b to the demodulator 114 (FIGS. 14 and 16). And 39a is grounded to circuit 300.

Each field coil 38 includes at least one winding layer or a plurality of winding layers. In an exemplary embodiment, each winding layer can include between 10 to 10,000 of turns. In an exemplary embodiment, a 24 gauge wire can be used in the coil. It should be appreciated that if a smaller or thicker gauge wire is used, more or less turns per layers may be used to yield the desired resistance.

The field body component 34 is illustrated as including a plurality of field bars 56 connected together so as to partially define the passage 44, and a plurality of field coils 38 disposed around the field body component 34. In accordance with alternative embodiments, the field body component 34 can be configured as a monolithic magnetic body that extends along an axis 46 with respect to the center of the passage 44. For instance, the field body component 34 can be configured as a tape wound magnetic core (see FIG. 11A) or a monolithic annular ring (FIG. 12) formed from magnetic materials. In other words, the field body component 34 can be any magnetic structure with a shape that at least partially defines a passage 44. Further, the field body component 34 can also define any suitable cross-sectional shape along the direction A as needed to attach to the drilling system component 35. The field body component can be made of any magnetic material.

Turning back to FIGS. 5, 6A, and 6B, the drive body component 36 is configured to support at least one drive coil at location that is offset from the axis 46 as noted above. In accordance with the illustrated embodiment, the drive body component 36 includes at least one drive bar, such as a first drive bar 52 and a second drive bar 54. The first and second drive bars 52 and 54 are attached to and overlap adjacent field bars 56a and 56h so as to span the gap 50, thereby providing a potential magnetic path between drive bars 52 and 54 and field bars 56a and 56h. The first and second drive bars 52 and 54 can be stacked along a direction A that is perpendicular to the direction L (FIG. 6B). The stacked configuration illustrated offsets the first and second drives bar 52 and 54 relative to axis 46 along the direction A, which offsets the respective drive coils 40 and 42 relative to the axis 46. The first and second coils 40 and 42 can define respective first and second drive coil axes 53 and 55. The first and second coils can extend, or turn around the respective axes 53 and 55 and extend along axes 53 and 55 in the direction L. The first and second drive bars 52 and 54 are attached to respective upper and lower surfaces 64a and 64b of the adjacent field bars 56a and 56h such that the first drive coil 40 and the second drive coil 42 are spaced apart from each other along the direction A. Further, the offset spaces the first drive coil axis 53 and the second drive coil axis 55 away from the axis 46 along a direction A or any direction angularly offset with respect to A. Fasteners 68 can attach the first and second drive bars 52 and 54 to adjacent field bars 56a and 56h. The fasteners 68 can minimize spacing between the drive bars 52 and 54 and field bars 56a and 56h at the overlap 69. It may be desirable to insert a magnetic paste in the overlap 69 so as to minimize disruption of a magnetic field passing within the drive body component 36 to the field body component 34.

Figure 9:
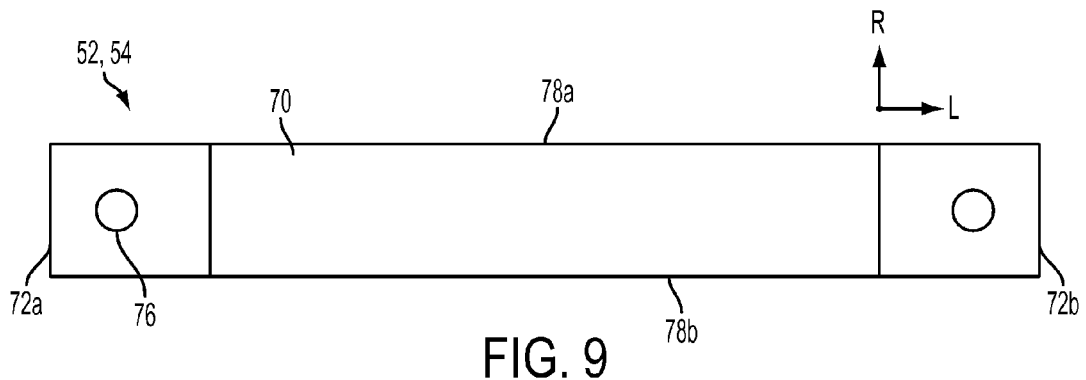
FIG. 9 is a top view of a drive bar of the current sensor shown in FIG. 5.
Figure 10:
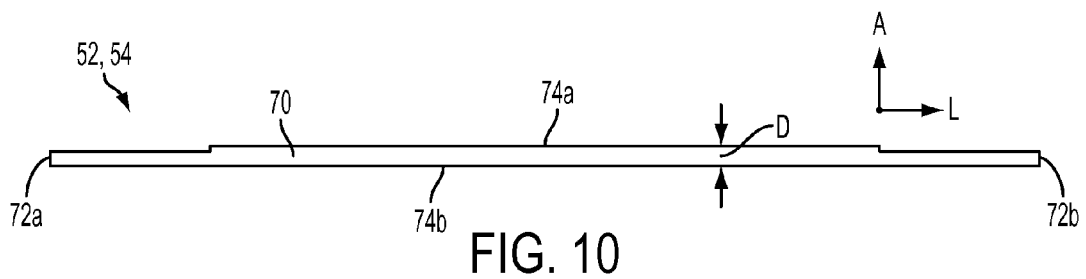
FIG. 10 is a side view of the field bar shown in FIG. 7.

Turning to FIGS. 9 and 10, each drive bar 52 and 54 includes an elongate body 70 having opposed ends 72a and 72b spaced apart along direction L, opposed upper and lower surfaces 74a and 74b spaced apart with respect to each other in the direction A, and opposed sides 78a and 78b spaced apart along direction R. Each drive bar 52 and 54 defines apertures 76 that are sized to receive fasteners 68 that connect drive bars 52 and 54 to the field bar 56a and 56h. Each drive bar 52 and 54 can define a second or drive bar maximum cross-sectional dimension D that extends from the upper surface 74a to the lower surface 74b along the direction A at a location at or near a midpoint of the body 70 between the opposed ends 72a and 72b. The first drive bar maximum cross-sectional dimension D1 may be less than the field drive bar maximum cross-sectional dimension T. Further, the second drive bar maximum cross-sectional dimension D2 may be less than the field drive bar maximum cross-sectional dimension T. In accordance with the illustrated embodiment, the combined first and second drive bar cross-sectional dimensions D1+D2 can be less than the field drive bar maximum cross-sectional dimension T. Each drive bar 52 and 54 can define a width that extends from side 78a to side 78b along a direction R that is perpendicular to the direction A, and a length that extends from the end 72a to the end 72b along the direction L that is perpendicular to the direction A and R. In exemplary embodiment, the cross-section area of drive bar could be less than the cross-sectional of the field bar It should be appreciated the cross-sectional area of the drive bar could be the same as or greater than the cross-sectional area of the field bar. While the drive bars 52 and 54 are shown as having a rectilinear body, the drives bars 52 and 54 can have define other shapes, such as a curved body configured to define an arc with respect to the center 48.

Turning now to FIGS. 6A and 6B, at least one drive coil is supported by the drive body component 36. In accordance with the illustrated embodiment, the first and second drive coils 40 and 42 surround the respective drive bars 52 and 54 in a stacked configuration. The first and second drive coils 40 and 42 can be connected in series along a circuit 300 or 400 (FIGS. 14 and 15). The circuit 300, 400 can include at least a power source (not shown) that can generate a drive current 106 through the first and second drive coils 40 and 42. Further, each drive coil 40 and 42 can be physically connected along the circuit via terminals 39c and 39d (illustrated as terminals 41c and 41d in FIGS. 14 and 15). It should be appreciate that more than one power source can be used such that the separate drive currents can be applied to the first and second drive coils 40 and 42.

Each drive coil 40 and 42 can include at least one winding layer or a plurality of winding layers. In an exemplary embodiment, each layer can include between 10 to 10,000 of turns. In an exemplary embodiment, a 24 gauge wire can be used in the coil. It should be appreciated that if a smaller or thicker gauge wire is used, more or less turns per layers may be used to yield the desired resistance.

In an alternative embodiment, the current sensor can be configured such that the at least one field coil can surround the at least one drive coil (not shown). In such an embodiment, although the magnetic field generated by the at least one drive coil is inside the field coil, the net magnetic field generated by the at least one drive coil is substantially zero, and therefore little, if any, voltage is induced into the field coil. This is because the drive coil produces magnetic fields equal and opposite to each other, and the surrounding field coil only measures the net field inside the magnetic body. Accordingly, while the at least one drive coil can be support by a second portion the magnetic body, the at least field coil can be supported by the first and second portions of the magnetic body. In such an embodiment, the at least one drive body components can be driven into and out of magnetic saturation, and thereby modulate the voltage induced in the at least one field coil.

The magnetic body 32, for instance the field body component 34 and the drive body component 36, may be formed a magnetic material. In general, magnetic materials have a relatively high magnetic permeability that can confine and guide magnetic fields. For instance, the magnetic material can be, for example, any hard and soft ferrous materials, such as ferrite, steel, iron, and/or nickel including alloys and composites thereof.

Figure 11A:
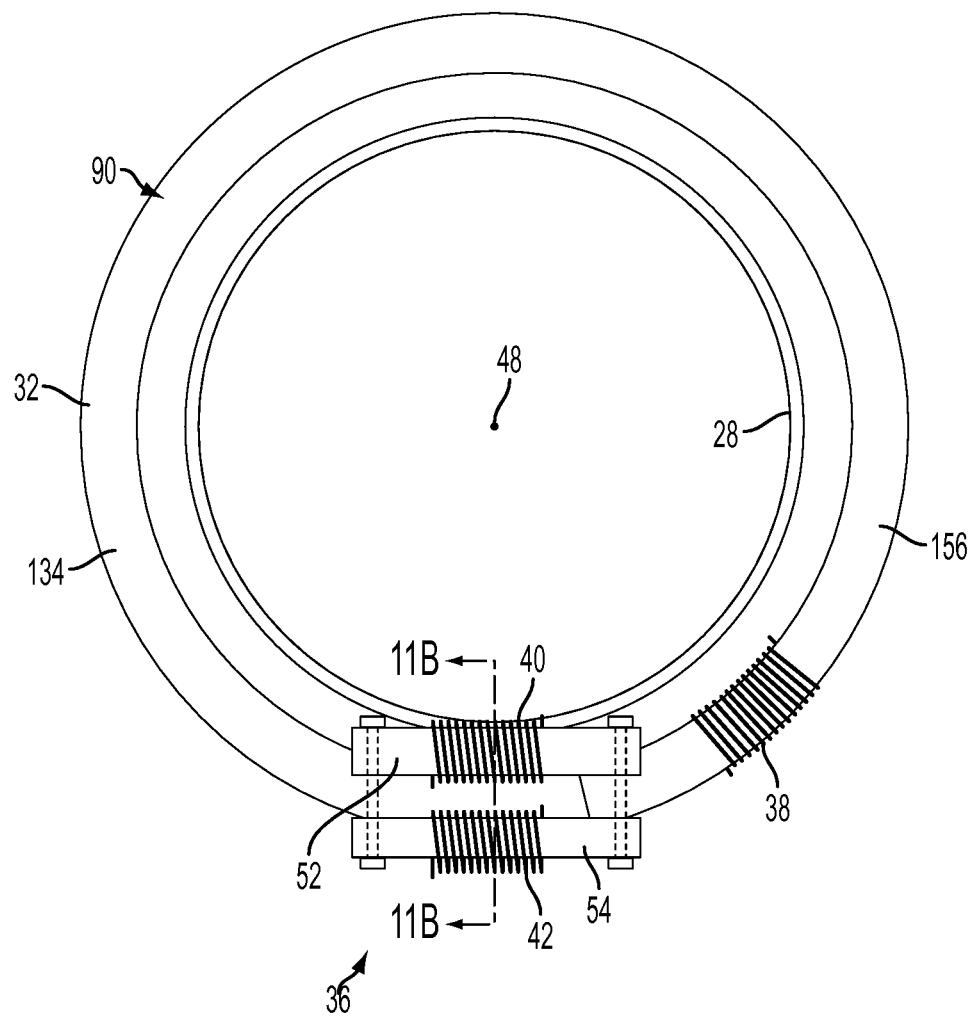
FIGS. 11A and 11B are top and cross-sectional views, respectively of a current sensor according to another embodiment of the present disclosure.
Figure 11B:
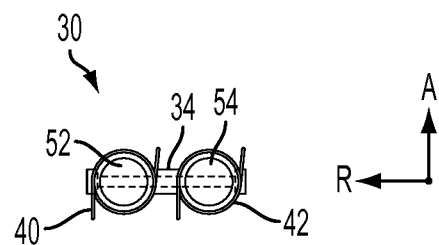

Turning now to FIGS. 11A-13B, alternate embodiments of magnetic body 32 are shown. FIGS. 11A and 11B illustrate current sensor 90 including a field body component 134 configured as a tape wound core 156. The drive body component 36 includes a pair of drives bars 52 and 54 that support respective drive coils 40 and 42. A field coil 38 can be disposed along a length of the tape wound core 156.

Figure 12A:
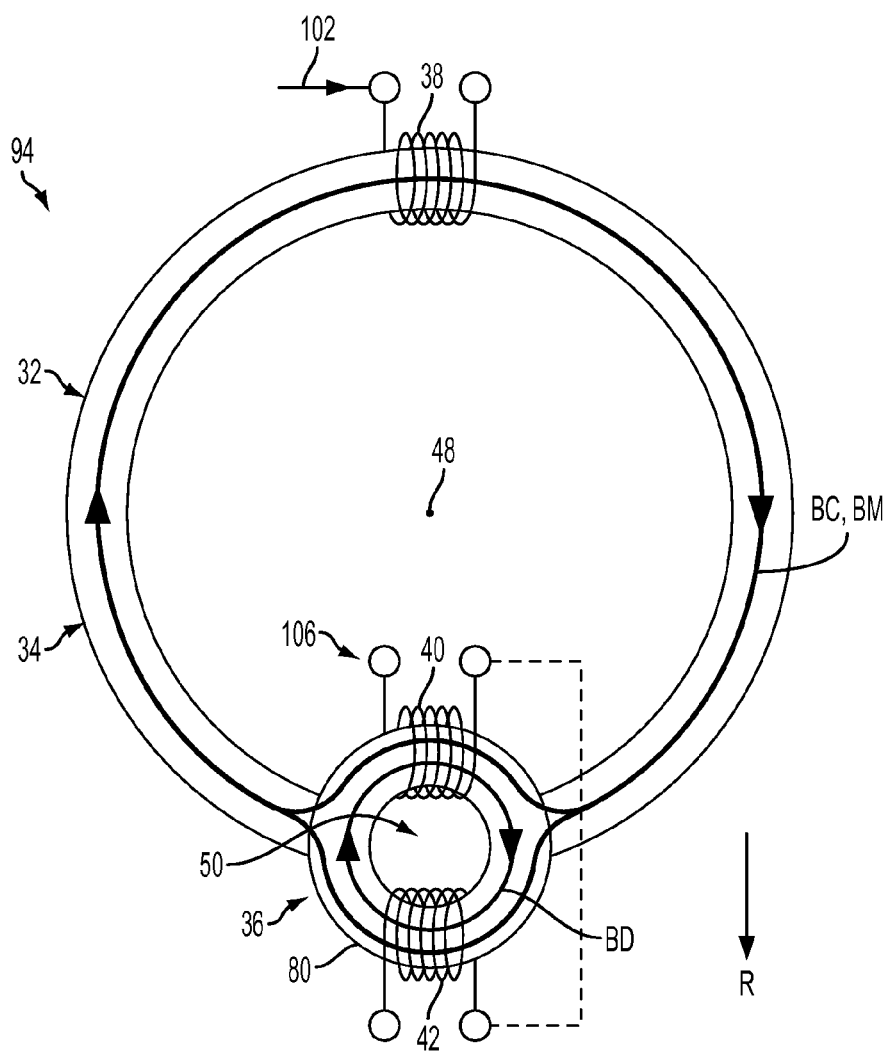
FIGS. 12A and 12B are top and cross-sectional views, respectively of a current sensor according to another embodiment of the present disclosure.
Figure 12B:
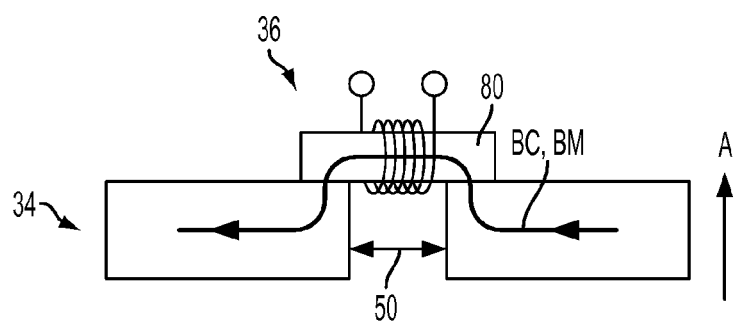

In the embodiment shown in FIGS. 12A and 12B, the current sensor 94 includes the first body component 34 configured as a plurality of connected field bars 56, or a monolithic body. In accordance with the alternative embodiment shown in FIGS. 12A and 12B, the drive body component 36 can be a toroid body 80 that is attached to the field body component 34 so as to span the gap 50. The first and second drive coils 40 and 42 can surround opposing sides to the toroid body 80. In such an embodiment, the toroid body 80 is offset from the axis 46 along a direction A, and the drive coils 40 and 42 are offset from the axis 46 in the direction R that is angularly offset with respect to the axis 46 and direction A. In accordance with the alternate embodiment, when a drive current is supplied to the coils 40 and 42 at least a majority of the drive magnetic field BD would not generate voltage, for instance an electromotive force, in the field coil 38. In this configuration the field coil can also be placed around the drive coil assembly instead of on the field body component 34 (not shown).

Figure 13A:
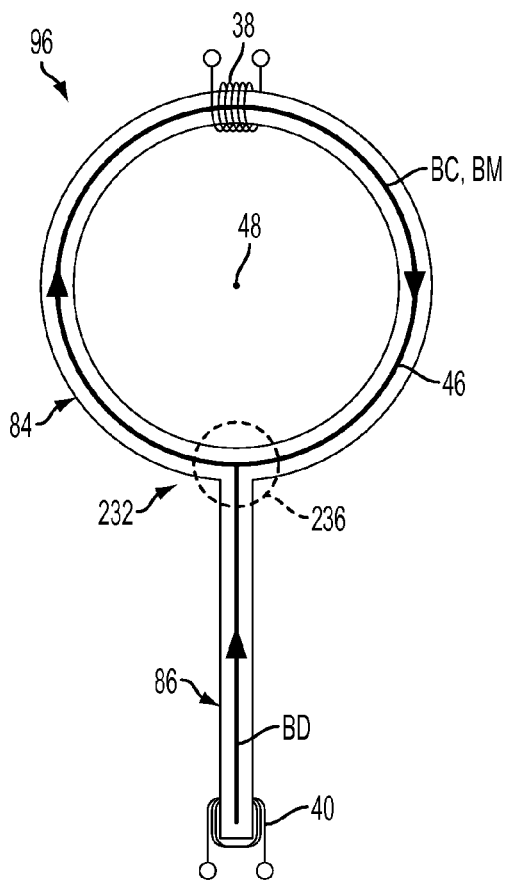
FIGS. 13A and 13B are side views of a current sensor according to another embodiment of the present disclosure.
Figure 13B:
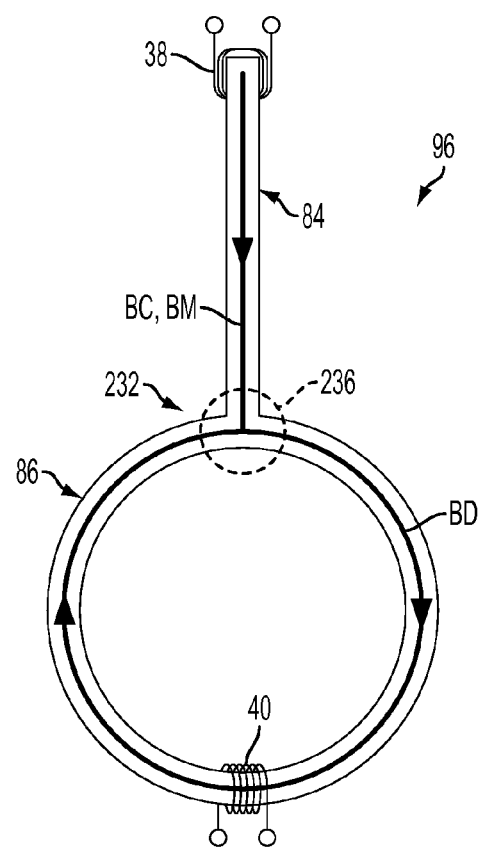
Figure 13C:
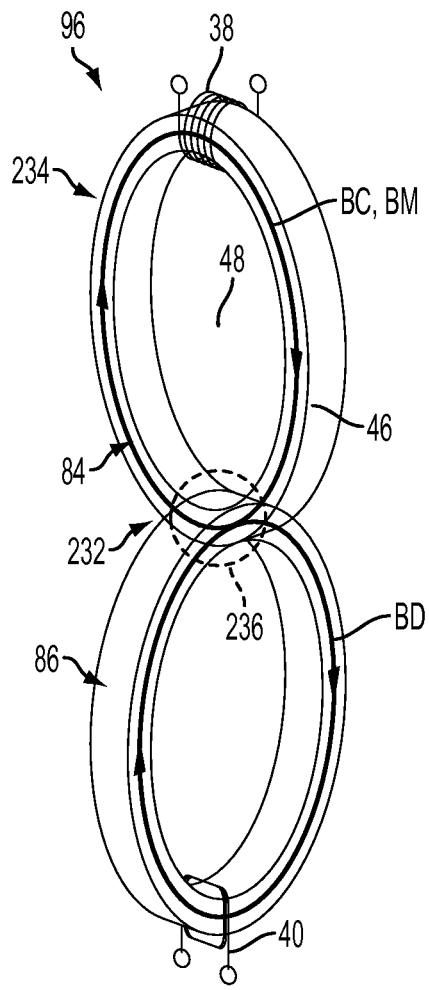
FIG. 13C is a perspective view of the current sensor shown in FIGS. 13A and 13B.

In yet another embodiment as shown in FIGS. 13A-13C, the current sensor 96 can include the magnetic body 232 configured as an offset toroid assembly. The offset toroid assembly includes a first or field toroid segment 84 coupled to a second or drive toroid segment 86 that is rotated with respect to the field toroid segment 84 about 90 degrees. The field toroid segment 84 is coupled to the drive toroid segment 86 at a body component 236. The body component 236 can be cycled into and out of magnetic saturation. The field toroid segment 84 includes a field coil 38 and the drive toroid segment 86 includes a drive coil 40. The drive coil is configured to generate a magnetic field, a majority of which does not induce an electromotive force in the field coil 38, in part because of the rotational and lateral offset of the drive coil 40 with respect to the field toroid segment 84. Thus, the drive coil is arranged so that its magnetic field does not induce a voltage in the field coil 38. It should be appreciated that this embodiment is not limited to toroidal components and any number of configurations of drive and field body components can be used to detect a signal current 102.

Figure 6D:
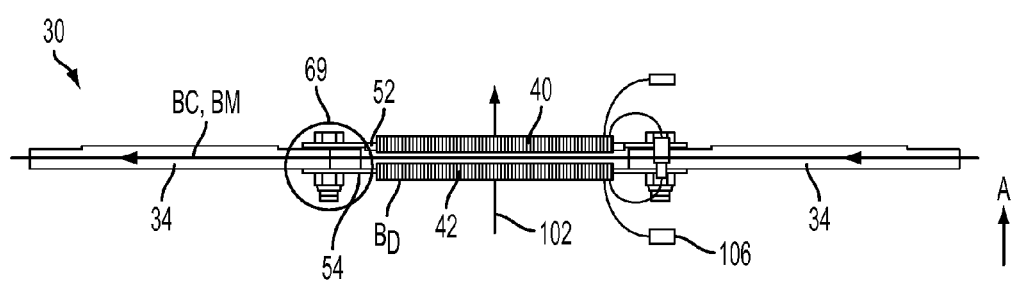
FIG. 6D is a partial side view of the current sensor shown in FIG. 6C.

Referring now to FIGS. 6C and 6D, the magnetic properties of the field and drive body components 34 and 36 permit the magnetic body 32 to iterate between a state where a magnetic field BC can be directed along the magnetic body 32 without disruption, and a state where the magnetic body 32 does not permit a magnetic field BC to pass along the magnetic body 32, i.e. the magnetic field BC is disrupted. The magnetic properties of the magnetic body 32 and the arrangement of the drive coils 40 and 42 relative to the field coil 38 on the magnetic body permit controlled iteration of the magnetic state of the magnetic body 32 as magnetic field BC is generated by the signal current 102. The result is low level, reliable signal current detection.

Continuing with FIGS. 6C and 6D, operation of the current sensor 30 will be described next with reference to FIGS. 6C and 6D. As the current 102 passes through current sensor 30, a first magnetic field BC is generated along the magnetic body 32 (FIG. 6C). The first magnetic field BC passes along the path that extends along the axis 46 in the field body component 34, through the overlap 69, and through the drive bars 52 and 54. A drive current 106 is applied the drive coils 40 and 42 generates a second magnetic field BD within the drive body component 36, for instance the drives bars 52 and 54 (FIG. 6B). The drive coils 40 and 42 are arranged relative to the field coils 38 such that generation of the second magnetic field does not generate voltage in the field coil 38. For instance the second magnetic field does not induce an electromotive force in the field coils 38. If the second magnetic field does induce an electromotive force, the electromotive force is negligible. The drive current 106 can be an alternating current. Application of the drive current 106 causes the drive bars 52 and 54 to cycle into and out of magnetic saturation. For instance, the drive current 106, and second magnetic field BD cause the drive bars 52 and 54 to cycle between 1) a first phase where the drives bars 52 and 54 are magnetically saturated so as to cause a break in the path of the first magnetic field BD momentarily at gap 50, and 2) a second phase where the drives bars 52 and 54 are phasing out of magnetic saturation so to as to remove the break in the path generated during the first phase. Cycling between the first and second phases, so that drive bars 52 and 54 are driven into and out of magnetic saturation, modulates the first magnetic field BC generating a modulated magnetic field BM. Cycling can occur at a frequency that is at least twice the highest frequency of the signal current. Accordingly, the first magnetic field BC can be modulated at a frequency that is at least twice a highest frequency of the signal current. As the modulated magnetic field BM passes within the magnetic body 32 and through the field coils 38, a modulated signal M is generated in the field coils 38. For instance, the modulated magnetic field BM can generate a voltage the field coils 38. The modulated signal M is then further processed as discussed below. An alternative to alternating current is to utilize a switched direct current.

Turning now to FIG. 14, the current sensor can be configured as an open-loop signal sensor 130. The open-loop sensor 130 may include the magnetic body 32, the field coil 38 support by the field body component 34, and at least one drive coil (40 or 42) supported by the drive body component 36, according to any one of the embodiment described above. The open-loop sensor 130 may be connected along a circuit 300 configured to provide open-loop current detection. The circuit 300 includes an oscillator 302, counter 304 for producing drive and field clocks, and a power amplifier 306 connected to the drive coil 40 (and/or drive coil 42) at terminals 41c and 41d. A power source (not shown) can supply current. The counter 304 may be connected to the power amplifier 306 and a demodulator 114. Field coil terminals 39a and 39b are connected to a ground and a high pass filter 308, respectively. The high-pass filter can include capacitor 308a and resistor 308b. The demodulator 114 may be a synchronous demodulator according to one embodiment. The amplifier 324 has an output signal that is proportional to the current flowing along the drilling system component 25, for instance the drill string 6 near BOP 29 (see FIGS. 3 and 5).

The oscillator 302 can produce an accurate and stable system clock. The counter 304 includes a "divide-by-N" counter that produces the drive clock, with a frequency $F_D$, and a field or detector clock, with frequency that is two times $F_D$. The drive clock, at frequency $F_D$, is applied to the power amplifier 306. The field clock, at a frequency of two (2) times $F_D$, is applied to the demodulator 114.

The power amplifier 306 has sufficient voltage and current to cycle the drive bars 52 and 54 into and out of saturation, as described above. In the illustrated embodiment, the power amplifier 306 applies an alternating current to the drive coils 40 and 42, which drives saturation of the drive bars 52 and 54 as noted above. When the drive bars 52 and 54 (FIG. 6B) are not in saturation, the first magnetic field BC associated with the signal current 102 is at a maximum. When the drive bars 52 and 54 are in saturation, the magnetic body 32 includes a break in the path and the first magnetic field BC is at a minimum. Cycling the drive bars 52 and 54 out and into saturation, which cycles the magnetic field BC between a minimum and maximum, modulates the magnetic field BC into a modulated magnetic field BM. The modulated magnetic field BM has a minimum and maximum occurring twice each cycle of the drive clock, for example. The modulated magnetic field BM produces a modulated voltage output at the field coil 38. The output of the field coil 38 is filtered through the high pass filter 308.

The demodulator 114 includes switches 312 and 314, each of which iterate between a first position and a second position. The output of the high pass filter 308 is then applied to the switches 312 and 314. The switches 312 and 314 are in the first position when the drive bars 52 and 54 are coming out of saturation and are in the second position when the drive bars 52 and 54 are going into saturation. The switches 312 and 314 are in the first position when connected to terminals 316 and 318, respectively. The switches 312 and 314 are in the second position (not shown) when connected to terminals 320 and 322, respectively. Switching between the first position and the second position occurs when the drive bars 52 and 54 are definitely not saturated or are definitely saturated, respectively.

The output of the demodulator 114 is applied to the amplifier 324. In accordance with the illustrated embodiment, the output signal of the field coil 38 will be of one polarity when the drive bars 52 and 54 are going into saturation (switches 312 and 314 may be in the first position). The output signal of the field coil 38 will be of the opposite polarity when the drive bars 52 and 54 are coming out of saturation (switches 312 and 314 may be in the second position). The opposite polarity signals generated by the demodulator 114 can be a pulsed output signal. The amplifier 324 includes inputs 326 and 328, such as inverting and non-inverting inputs, respectively. In the illustrated embodiment, the amplifier is configured as an integrator. The pulsed output signal can be applied to the inputs 326 and 328 of the amplifier 324. As illustrated, the amplifier 324 is configured to integrate the pulsed output signal from demodulator 114 over a fixed length window, for instance by limiting the DC gain of the demodulator 114. As noted above, the output 330 of the circuit 300 is a modulated signal that will be proportional to the current 102 flowing on the drilling system component 25. The output 330 can be applied to receiver components 112 (FIG. 4) and/or a computer processor (FIG. 4) for further signal processing. For instance, the output 330 can be received by a controller (not shown) that is configured to, in response to receiving the output 330, cause a processor to decode the output signal 330. Output from decoding the output signal can be drilling data, which can be used with one or more analytical and display applications running on the computing device 200. It should be appreciated that alternative implementations of the circuit 300 described above may be used to aid in open-loop signal detection. The configuration of the components along the circuit 300 can vary and no single element of the circuit 300 is essential.

Turning to FIG. 15, the current sensor can be configured as a closed-loop sensor 230. The closed-loop sensor 230 may include the magnetic body 32, the field coil 38 supported by the field body component 34, and at least one drivel coil (40 or 42) supported by the drive body component 36, according to any one of the embodiments described above. The closed-loop sensor 230 may be connected along a circuit 400 configured to provide closed-loop current detection. The closed-loop sensor circuit 400 can include similar elements to the open-loop circuit 300 described above. For instance, the circuit 400 includes an oscillator 302, counter 304, power amplifier 306, demodulator 114, and an amplifier 324 configured as an integrator. In the closed-loop configuration, the amplifier 324 is configured for high gain. In accordance with the illustrated embodiment, the output of the amplifier 324 is applied to a current source 332. The output of the current source 332 is then applied to the field coil 38. The current source 332 should have a relatively high output impedance so as to avoid degradation of the signal pulse amplitude coming from the field coil 38. When the amplifier 324 is configured for high gain, a current can be applied back into the field coil 38 that is nearly equal to the signal current 102 divided by the total number of turns in the field coil. The result is the near, but not total, cancellation, of the first magnetic field BC flowing in the magnetic body 32. The output signal 430 of the circuit 400 is generated using an amplifier 334, such as current-to-voltage converter. The output signal 430 is proportional to the current flowing on drill string 6. The feedback can drive the system to drive toward a more linear level, such as 90% or more linear.

Turning to FIG. 16, a method 500 for detecting a current 102 using the current sensor 30 can include installing (not shown) the current sensor 30 along a portion of the drilling system component 25. Step 502 of the method can include transmitting a signal current toward a current sensor supported by a drilling system component. In step 504, a first magnetic field is generated within the magnetic body along a path defined by the magnetic body. Step 506 can include applying a current to the drive coil. For instance, step 506 can include applying alternating current to the drive coil. In step 508, a second magnetic field is generated by the drive coil so as to cause the second portion, such as drive body component 36 to alternate into and out of magnetic saturation. Next, in step 510, the drive body component 36 is cycled between 1) a first phase where the drive body component 36 is magnetically saturated so as to generate a break in the path of the first magnetic field, and 2) a second phase where the drive body component 36 is magnetically unsaturated so as to remove the break in the path generated during the first phase. The method can include, in step 512, modulating the first magnetic field that passes within the magnetic body by repeating the first and second phases over a period of time. In modulating step 512, the first magnetic field can be modulated in proportion to a frequency that the first and second phases are repeated over a period of time. Step 514 includes inducing a modulated signal in the at least one field coil as a portion of the modulated first magnetic field passes within the magnetic body. The modulated magnetic field passes through the field coils and induces the modulated voltage in the field coil. In step 516, the modulated voltage signal can be demodulated into an output signal that is proportional to the signal current passing along the drilling system component. Step 518 can include processing the output signal. For instance, the method can include decoding the output signal and analyzing the drilling data encoded in the output signal. For close-loop configurations, the method can included applying a signal current to the field coil 38.

What is claimed:

1. A current sensor configured to detect a signal current in a drilling system component of a drilling system, the signal current including encoded data, the drilling system configured to form a borehole in an earthen formation, the current sensor comprising:
    a magnetic body at least partially composed of a magnetic material, the magnetic body including a first portion that defines a gap and a second portion attached to the first portion such that the second portion spans the gap;
    at least one field coil positioned on the first portion of the magnetic body, the at least one field coil configured to detect a first magnetic field that passes within the magnetic body, the first magnetic field being induced by the signal current carried by the drill system component when the current sensor is positioned in proximity to the drilling system component carrying the signal current; and
    at least one drive coil positioned on the second portion of the magnetic body, the at least one drive coil configured to generate a second magnetic field,
    wherein when the current sensor is positioned in proximity to the signal current and the at least one drive coil generates the second magnetic field, the current sensor is adapted such that 1) the second magnetic field causes the second portion of the magnetic body to alternate into and out of magnetic saturation so as to modulate the first magnetic field that passes within the magnetic body, and 2) modulation of the first magnetic field induces a modulated signal in the at least one field coil.

2. The current sensor of claim 1, wherein the least one drive coil and the at least one field coil are arranged on the magnetic body such that at least a majority of the second magnetic field produced by the at least one drive coil does not induce an electromotive force in the at least one field coil when the at least one drive coil produces the second magnetic field.

3. The current sensor of claim 1, wherein the at least one drive coil comprises a first drive coil and a second drive coil connected to the first drive coil, the first and second drive coils configured to generate the second magnetic field.

4. The current sensor of claim 3, wherein the current sensor is adapted to generate the second magnetic field in a first direction in the first drive coil and in a second direction in the second drive coil, the second direction being opposite the first direction, such that the net sum of respective magnetic field vectors of the second magnetic field is at or near zero.

5. The current sensor of claim 3, wherein the second portion of the magnetic body includes a first drive bar and a second drive bar, wherein the first drive coil surrounds the first drive bar and the second drive coil surrounds the second drive bar, wherein the first and second drive bars are attached to the first portion of the magnetic body.

6. The current sensor of claim 1, wherein the first portion of the magnetic body comprises a tape wound core, and the second portion of the magnetic body is attached to the tape wound core.

7. The current sensor of claim 1, wherein the first portion of the magnetic body includes at least one field bar, and the at least one field coil surrounds the at least one field bar.

8. The current sensor of claim 7, wherein the at least one field bar comprises a plurality of interconnected field bars, and the at least one field coil comprises a plurality of field coils, wherein a respective one of the plurality of field coils surrounds a respective one of the plurality of field bars.

9. The current sensor of claim 1, wherein the first portion includes at least one field bar, and the second portion of the magnetic body is at least one drive bar, and the at least one field coil surrounds the at least one field bar.

10. The current sensor of claim 1, wherein the modulated signal is proportional to the signal current.

11. The current sensor of claim 1, wherein the current sensor is configured to modulate the first magnetic field at a frequency that is at least twice a highest frequency of the signal current.

12. The current sensor of claim 1, wherein the first portion of the magnetic body comprises a first body component that extends along an axis, and the second portion of the magnetic body comprises a second body component that is attached to the first body component and is offset from the first body component along a direction that is angularly offset with respect to the axis.

13. The current sensor of claim 1, wherein magnetic body defines a central axis, and the at least one drive coil includes a first drive coil and a second drive coil, wherein the second portion of the magnetic body supports the first and second drive coils such that the first and second drive coils are each offset from the central axis.

14. The current sensor of claim 1, wherein the first portion defines a first end that includes a first end surface, and a second end spaced from the first end, the second end including a second end surface that faces the first end surface, wherein the gap is defined from the first end surface to the second end surface.

15. The current sensor of claim 14, wherein the second portion overlaps the first end and the second end so as to span the gap.

16. A telemetry system for a drilling system, the drilling system including a drill string and a drill bit that is configured to define a borehole in an earthen formation, the telemetry system comprising:
a receiver that includes a magnetic body, the magnetic body including a first portion that defines a gap, and a second portion attached to the first portion such that the second portion spans the gap, and a first magnetic field passes along the magnetic body when the receiver is in proximity to the drilling system component that carries a signal current, the receiver further including at least one field coil positioned on the first portion of the magnetic body, and at least one drive coil positioned on the second portion of the magnetic body,
the at least one drive coil configured to generate a second magnetic field such that at least a majority of the second magnetic field produced by the at least one drive coil does not generate a significant voltage in the at least one field coil when the at least one drive coil generates the second magnetic field,
wherein the receiver is configured to alternate the second portion of the magnetic body into and out of magnetic saturation, thereby modulating the first magnetic field that passes at least partially through the at least one field coil, thereby inducing a modulated signal in the at least one field coil.

17. The telemetry system of claim 16, wherein the at least one drive coil is arranged on the magnetic body relative to the at least one field coil such that at least a majority of the second magnetic field does not induce an electromotive force in the at least one field coil when the at least one drive coil generates the second magnetic field.

18. The telemetry system of claim 16, further comprising a transmitter configured to transmit a signal current to the receiver.

19. The telemetry system of claim 18, further comprising at least one electromagnetic (EM) telemetry tool, the EM tool including the transmitter.

20. The telemetry system of claim 18, further comprising at least one measurement-while-drilling (MWD) tool, the MWD tool including the transmitter.

21. The telemetry system of claim 16, further comprising a demodulator configured to be electrically connected the at least one field coil.

22. The telemetry system of claim 16, wherein the at least one drive coil comprises a first drive coil and a second drive coil connected to the first drive coil, the first and second drive coils configured to generate the second magnetic field.

23. The telemetry system of claim 22, wherein the second portion of the magnetic body includes a first drive bar and a second drive bar, wherein the first drive coil surrounds the first drive bar and the second drive coil surrounds the second drive bar, wherein the first and second drive bars are attached to the first portion of the magnetic body.

24. A method for detecting a signal current transmitted along a drilling system component of a drilling system, the method comprising:
transmitting a signal current toward a current sensor supported by the drilling system component, the current sensor including a magnetic body, the magnetic body including a first portion that defines a gap, and a second portion attached to the first portion such that the second portion spans the gap, at least one field coil supported by the first portion of the magnetic body, and at least one drive coil supported by the second portion of the magnetic body, the signal current generating a first magnetic field within the magnetic body;
generating a second magnetic field via the at least one drive coil so as to cause the second portion of the magnetic body to alternate into and out of magnetic saturation, thereby modulating the first magnetic field within the magnetic body; and
in response to the generating step, causing the modulated first magnetic field to induce a modulated signal in the at least one field coil as a portion of the modulated first magnetic field passes through the magnetic body and through a portion of the at least one field coil.

25. The method of claim 24, wherein the at least one drive coil is arranged on the magnetic body relative to the at least one field coil such that at least a majority of the second magnetic field does not generate a voltage in the at least one field coil.

26. The method of claim 24, wherein the second magnetic field does not induce an electromotive force in the at least one field coil.

27. The method of claim 24, further comprising the steps of:
obtaining drilling information; and
encoding the drilling information into the signal current.

28. The method of claim 27, wherein the modulated signal is an output signal that is indicative of the drilling information, wherein method further comprises the step of decoding the modulated signal so as to obtain the drilling information.

29. The method of claim 27, wherein the modulated signal from the at least one field coil is indicative of the signal current, the signal current being indicative of the drilling information, wherein the method further comprises the steps of:

demodulating the modulated signal from the at least one field coil; and decoding the demodulated output signal to obtain drilling information.

30. The method of claim 24, wherein the magnetic body defines a path for a portion of the first magnetic field, the method further comprising the step of:

cycling the second portion of the magnetic body between 1) a first phase where the second portion is driven into magnetic saturation so as to generate a break in the path of the first magnetic field that passes through the magnetic body, and 2) a second phase where the second portion of magnetic body is driven out of magnetic saturation so as to remove the break generated during the first phase.

31. The method of claim 30, further comprising the step of repeating the first and second phases over a period of time so as to modulate the first magnetic field that passes through the magnetic body along the path, the first magnetic field being modulated in proportion to a frequency that the first and second phases are repeated over the period of time.

32. The method of claim 31, wherein a frequency of the modulation of the first magnetic field is at least twice a frequency of the signal current.

33. The method of claim 24, wherein the step of generating the second magnetic field includes causing an alternating current to pass through the at least one drive coil.

34. The method of claim 24, wherein the at least one drive coil is a first drive coil and a second drive coil, the first and second drive coils configured to produce the second magnetic field in the magnetic body.

35. The method of claim 34, further comprising the step of applying first and second drive currents to the first and second drives coils, respectively.

36. The method of claim 34, wherein the step of generating the second magnetic field causes the second portion of the magnetic body to alternate into and out of magnetic saturation.

37. The method of claim 36, wherein the second portion of the magnetic body includes a first drive bar and a second drive bar, wherein the first drive coil is carried by the first drive bar and the second drive coil is carried by the second drive bar, wherein the step of generating the second magnetic field causes the first and second drive bars to alternate into and out of magnetic saturation.

38. The method of claim 34, wherein the first portion of the magnetic body includes the at least one field bar, and the at least one field coil surrounds the at least one field bar, the method further comprising the step of causing the first magnetic field to pass along the at least one field bar.

39. The method of claim 24, wherein the drilling system is supported by a surface of a formation and configured to define a borehole into the formation, wherein the step of transmitting includes transmitting the signal current from a downhole location in the borehole toward the surface.

* * * * *